United States Patent
Subramaniam et al.

(10) Patent No.: US 9,373,964 B2
(45) Date of Patent: Jun. 21, 2016

(54) OPTIMIZED CONTROL OF A POWER CONVERTER IN RESPONSE TO LOAD CONDITIONS

(71) Applicant: General Electric Company, Schenectady, NY (US)

(72) Inventors: Palanivel Subramaniam, Richardson, TX (US); Raghothama Reddy, Murphy, TX (US); Darwin Smith, Rockwall, TX (US)

(73) Assignee: General Electric Company, Schenectady, NY (US)

( * ) Notice: Subject to any disclaimer, the term of this patent is extended or adjusted under 35 U.S.C. 154(b) by 601 days.

(21) Appl. No.: 13/785,154

(22) Filed: Mar. 5, 2013

(65) Prior Publication Data

US 2013/0307339 A1    Nov. 21, 2013

Related U.S. Application Data

(60) Provisional application No. 61/647,807, filed on May 16, 2012, provisional application No. 61/651,112, filed on May 24, 2012.

(51) Int. Cl.

| | |
|---|---|
| *H02J 3/38* | (2006.01) |
| *H02J 5/00* | (2016.01) |
| *H02J 7/34* | (2006.01) |
| *H02M 3/04* | (2006.01) |
| *H02M 3/24* | (2006.01) |

(Continued)

(52) U.S. Cl.
CPC ... *H02J 5/00* (2013.01); *H02J 3/38* (2013.01); *H02J 3/382* (2013.01); *H02J 7/34* (2013.01); *H02M 1/4225* (2013.01); *H02M 1/4258* (2013.01); *H02M 3/04* (2013.01); *H02M 3/24* (2013.01); *H02M 7/125* (2013.01); *Y02B 10/14* (2013.01); *Y02B 70/126* (2013.01); *Y10T 307/625* (2015.04); *Y10T 307/658* (2015.04)

(58) Field of Classification Search
CPC .............................. H02M 1/4258; H02J 3/382
See application file for complete search history.

(56) References Cited

U.S. PATENT DOCUMENTS

| | | | | |
|---|---|---|---|---|
| 5,820,172 | A * | 10/1998 | Brigham ................. | B60K 6/485 180/65.26 |
| 6,208,118 | B1 * | 3/2001 | Li ........................... | H02J 9/061 320/137 |
| 7,796,404 | B2 | 9/2010 | Reddy | |

(Continued)

*Primary Examiner* — Thienvu Tran
*Assistant Examiner* — Pinping Sun
(74) *Attorney, Agent, or Firm* — General Electric Company

(57) ABSTRACT

A power converter and a method of operating the same is described, for use in a power conversion system that is capable of receiving power from various sources, including renewable sources, for delivering power to a load. Power type detection circuitry is provided for identifying the type of power source at the input of each power detector, based on attributes of the time-varying power received. The power converter is constructed of a boost stage followed by a galvanically isolated DC-DC converter stage. If a renewable input power source is detected, the boost stage is controlled to operate at a maximum power point, and the DC-DC converter stage is operated in an open loop manner when load exceeds available power at input. The load falls below available input power, the boost stage is controlled to regulate its output voltage and DC-DC converter stage is also placed under closed loop control. If the AC grid is detected as the input power source, the boost stage is controlled to attain maximum power factor, and the DC-DC converter stage is placed under feedback control of the output voltage.

6 Claims, 19 Drawing Sheets

(51) Int. Cl.
*H02M 7/12* (2006.01)
*H02M 1/42* (2007.01)

(56) References Cited

U.S. PATENT DOCUMENTS

| | | | |
|---|---|---|---|
| 2004/0179382 A1* | 9/2004 | Thaker | H02J 1/08 363/74 |
| 2005/0258795 A1* | 11/2005 | Choi | B29C 45/7666 318/625 |
| 2011/0006600 A1* | 1/2011 | Fontana | H02J 1/10 307/25 |
| 2011/0103114 A1* | 5/2011 | Huang | H01L 31/02021 363/131 |
| 2011/0273015 A1* | 11/2011 | Adest | H01L 31/02021 307/43 |
| 2012/0081934 A1* | 4/2012 | Garrity | H02M 7/46 363/37 |
| 2013/0003430 A1* | 1/2013 | Reddy | H02M 7/217 363/74 |
| 2013/0138279 A1* | 5/2013 | Shi | B60L 1/00 701/22 |

* cited by examiner

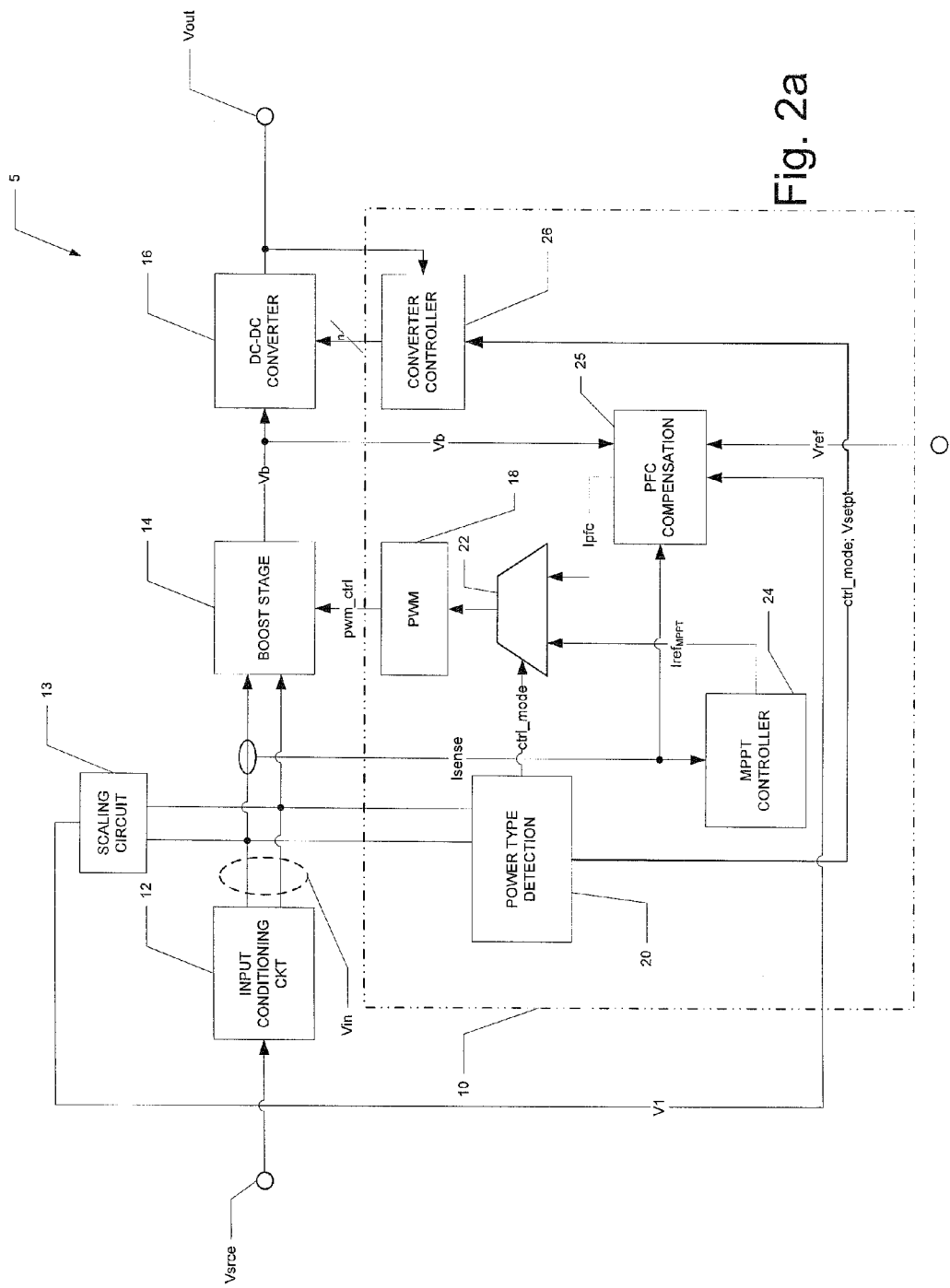

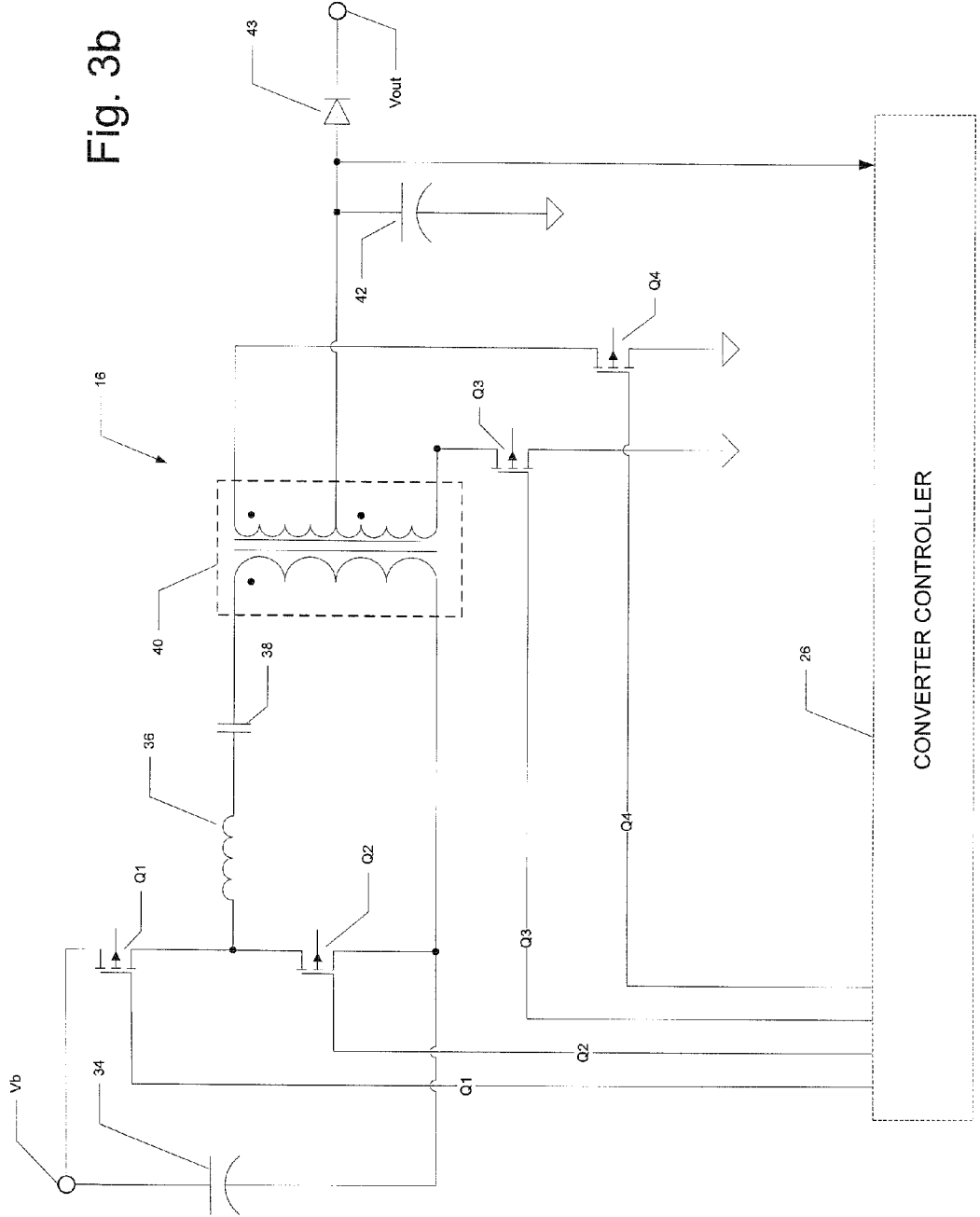

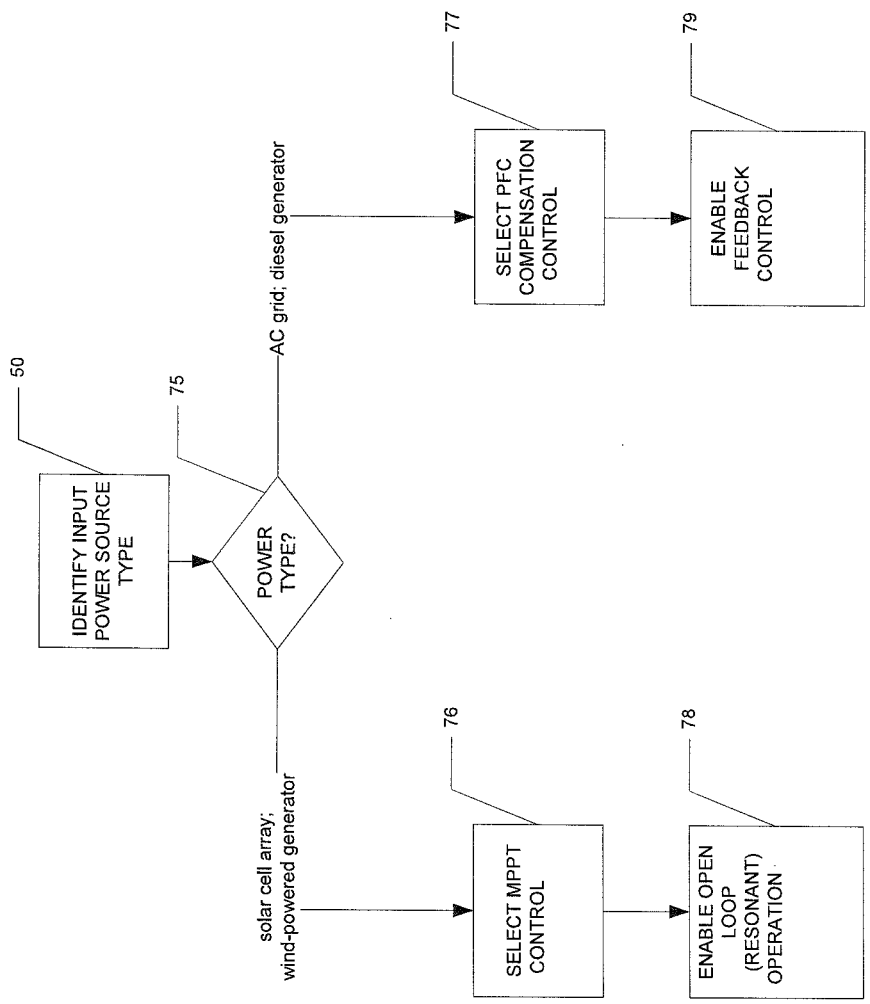

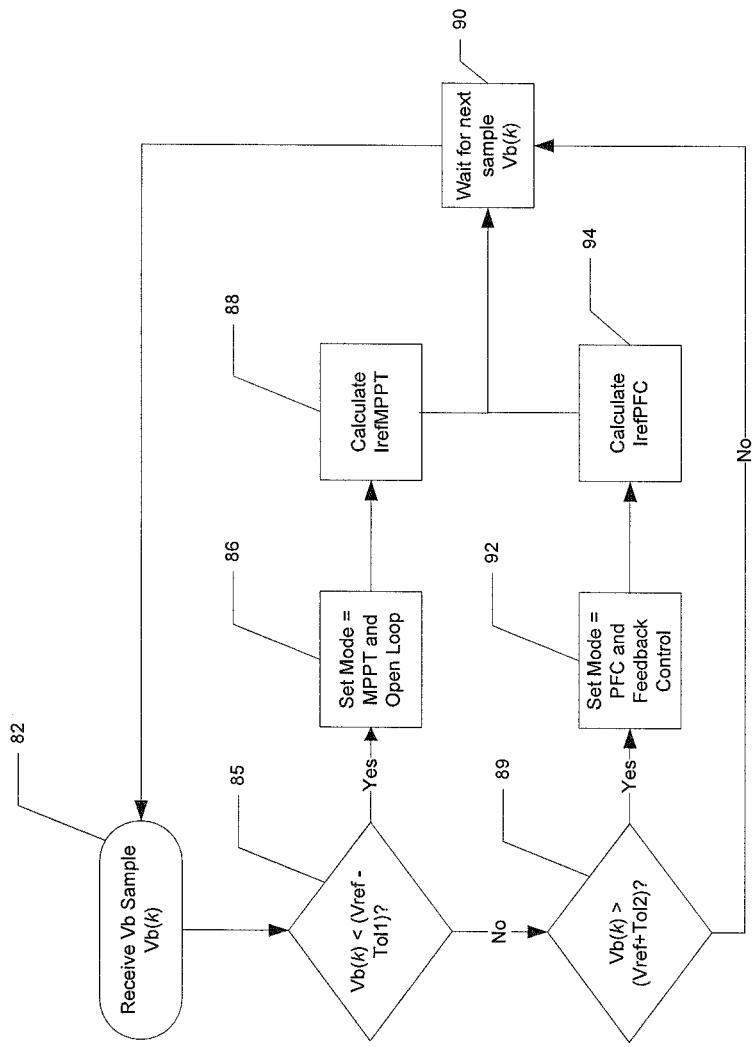

OPTIMIZED CONTROL OF A POWER CONVERTER IN RESPONSE TO LOAD CONDITIONS

CROSS-REFERENCE TO RELATED APPLICATIONS

This application claims priority, under 35 U.S.C. §119(e), to Provisional Application No. 61/647,807, filed May 16, 2012, and to Provisional Application No. 61/651,112, filed May 24, 2012, both of which are incorporated herein by this reference.

BACKGROUND

This disclosure is in the field of electric power distribution. The disclosed embodiments are directed to power converters and systems of power converters capable of receiving power from various types of power sources.

The generation of electrical power from renewable energy sources such as solar, wind, water, and geothermal has become more popular in recent years. Solar and wind energy have become especially attractive in providing electrical power to loads near the generation site, such as at cellular telephone towers, telecommunication central offices, home or business locations that are independent from the electrical power grid, and the like. However, as well known in the art, the electrical power generated by solar and wind-generated electrical power will fluctuate over time (e.g., day vs. night for solar power), and in response to weather and other environmental conditions.

To reduce the expense of metered power from the AC grid, and also to reduce environmental impact, it is often desirable to use power from renewable sources such as solar cell arrays, wind-powered generators, and the like when that power is available. This preference is especially useful at remote or otherwise self-contained installations of both a renewable power source and the load powered by that power source, such as at cell towers. However, the power generated by different types of power sources, particularly renewable sources, exhibit different attributes from one another. These differences render it difficult to arrive at a power converter architecture that can optimally and efficiently convert power from this wide array of input power sources.

In some situations, power converters supplying power from renewable power sources are deployed at locations that are remote from the AC electrical grid. For example, a mobile communications base station site may be deployed at a rural or backwoods location, prohibitively far from the electrical grid. In those situations, excess power from the renewable power source can be supplied to the grid through an inverter, if available. In the absence of such an expensive system the excessive power cannot be harvested to prevent damage to the power converter system. This situation is exacerbated if the power demand by the load is variable, and if a battery backup system is not present or if the batteries are fully charged.

BRIEF SUMMARY OF THE EMBODIMENTS

Disclosed embodiments provide a power converter, and method of operating the same, capable of responding to variable load conditions and of selecting its control mode accordingly.

Disclosed embodiments provide such a power converter and method operable to adaptively control power conversion from renewable power sources so as to match variable load demand.

Disclosed embodiments provide such a power converter and method having high dynamic bandwidth.

Disclosed embodiments provide such a power converter and method capable of recognizing the type of power source at its input, and of selecting its control mode accordingly.

Disclosed embodiments provide such a power converter and method that maximizes harvested power when converting power from a renewable power source under load demand conditions exceeding the capability of that power source.

Disclosed embodiments provide a system including multiple such power converters, and a method of operating the same, in which each power converter adaptively selects its control mode without requiring a separate system controller.

A power converter circuit that converts input power from renewable power sources into DC power applied to a load, includes controller circuitry that is responsive to load conditions. Responsive to detecting that load conditions are consuming at least as much power converted from the renewable power source at a maximum power operating point, the power converter circuit is controlled to operate at that maximum power point. Responsive to detecting reduction in the power demand by the load, the power converter circuit is feedback-controlled to match the load demand and output voltage setpoint.

BRIEF DESCRIPTION OF THE SEVERAL VIEWS OF THE DRAWING

FIGS. 2a, 2b, and 2c are electrical diagrams, in block form, of exemplary power converters in the system of FIG. 1.

FIG. 3b is an electrical diagram, in schematic form, of an isolating DC-DC converter stage or any other DC-DC converter as useful in the power converter of FIGS. 2a, 2b, and 2c.

FIG. 4b is a waveform diagram illustrating the operation of the AC/DC detection circuit of FIG. 4a.

FIG. 4c is a flow diagram illustrating the operation of the AC/DC detection circuit of FIG. 4a.

FIG. 7 is a flow diagram illustrating the operation of the power converter of FIGS. 2a, 2b, and 2c.

FIGS. 10a through 10d are a flow diagram illustrating the operation of the power converter of FIG. 7.

DETAILED DESCRIPTION OF THE EMBODIMENTS

In many situations, the power is from a renewable source (eco-source) such as solar, wind, thermal, or hydro power, and it is being used to charge a battery or power load equipment that uses a DC input. Such eco-sources supply DC or AC power that are input to a universal power converter that can accept any types of input power. It is often more efficient to directly convert the eco-source power to DC in order to charge batteries or to supply a load at the output of the universal power converter.

Figure 1:
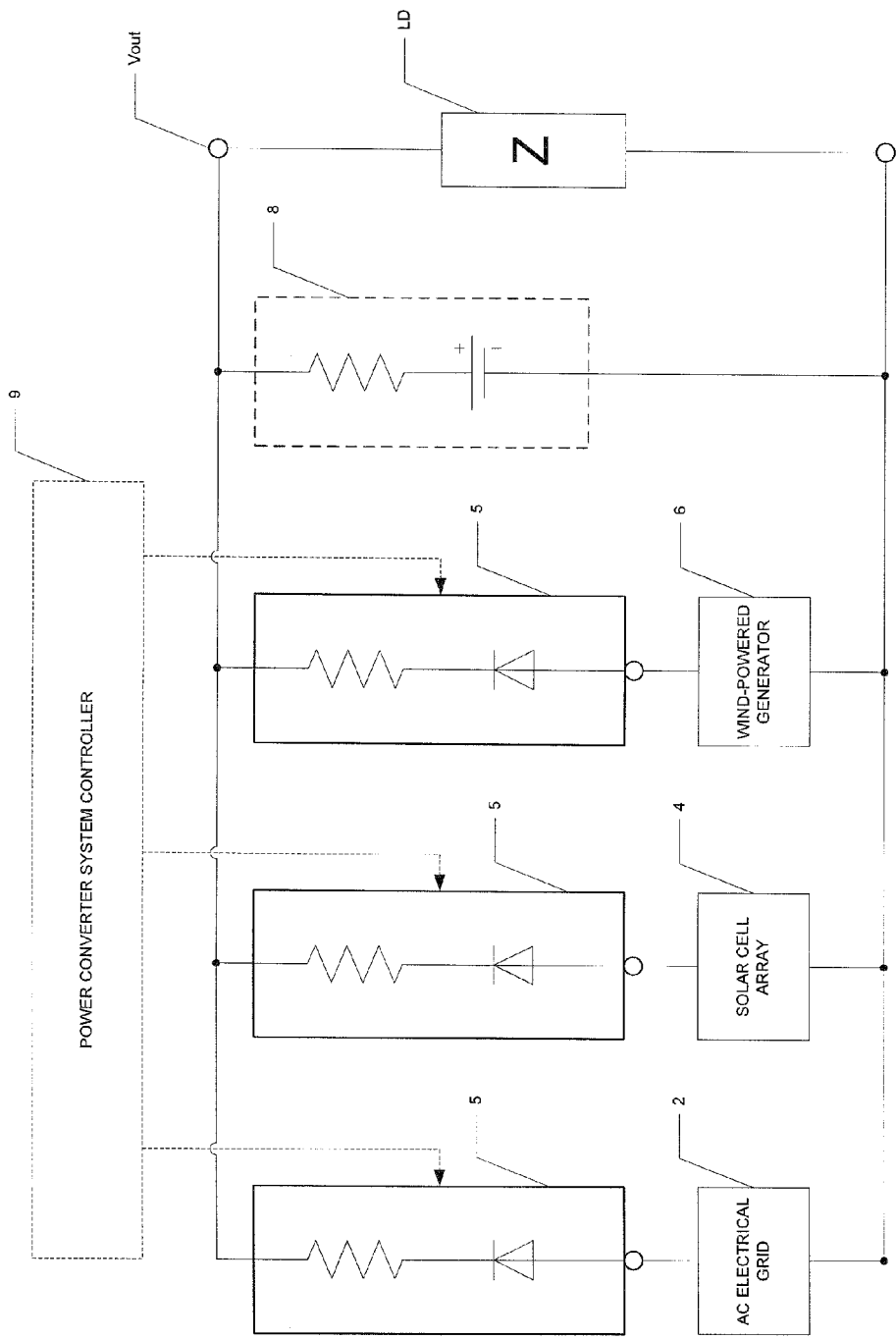
FIG. 1 is an electrical diagram, in block and schematic form, of a power converter system.

FIG. 1 illustrates a power converter system constructed according to the embodiments disclosed in this specification. This system includes multiple power converters 5 that each converts power received from one of multiple various available power sources 2, 4, 6, and applies that power to load LD at output power bus Vout. While a single power converter 5 is shown in FIG. 1 as associated with each power source 2, 4, 6, it is contemplated that multiple power converters 5 may be connected in parallel to simultaneously convert power from any or all of power sources 2, 4, 6. Load LD may correspond to any facility that consumes electrical power, for example transceivers, antennae, and other electronic functions at a cellular telephone tower system; motors, lighting, switching gear, and other loads installed at a home or commercial facility; loads at smaller-scale systems such as intersection traffic signals; and the like.

In the system of FIG. 1, the available power sources include the AC electrical grid 2, solar cell array 4, wind-powered generator (i.e., windmill) 6, and battery backup system 8. Other types of power sources may also be used in some embodiments, including diesel generators, geothermal electrical generators, water-powered generators, fuel cells, and the like. Of course, more or fewer power sources may be included within any particular power converter system installation. Battery backup system 8 is optionally included within this power converter system, to provide emergency power to load LD if all of power sources 2, 4, 6 become unavailable or inadequate at a point in time. If so provided, battery backup system 8 would include charging circuitry for charging the available batteries from output power bus Vout, in effect becoming part of the effective load to power sources 2, 4, 6 and power converters 5. In a co-generation context, load LD may correspond to the AC electrical grid itself, in which case an inverter (not shown) would receive power from output power bus Vout and produce AC power for application to the grid.

Power converter system controller 9 is optionally provided in the system of FIG. 1. As will become apparent from the following description, each power converter 5 may autonomously control its operation without relying on external power system controller 9 to effect such control. Even so, power system controller 9 may still be provided for purposes of overall system monitoring, configuration and adjustment of various parameters (e.g., the target output DC voltage from each power converter 5), and the like.

According to the disclosed embodiments, the power converter system of FIG. 1 is operated to preferentially convert power from one or more of the sources relative to the others, for example to favor drawing power from renewable sources first, using power from the grid or from a diesel generator when necessary (e.g., when power from solar and wind sources is insufficient), and relying on battery backup power only in emergencies. This prioritization minimizes the consumption of metered power and, in the environmentally-sensitive sense, minimizes the consumption of power from fossil-fuel sources. Application of this priority scheme to the system of FIG. 1 would prioritize the use of power from solar cell array 4 and wind-powered generator 6 over power from AC electrical grid 2 and other fossil-fuel powered or metered power sources, such as diesel generators. This prioritization may be accomplished in a similar manner to that described in U.S. Patent Application Publication No. US 2011/0006600, commonly assigned herewith and incorporated hereinto by reference, by controlling power converters associated with renewable and other preferred power sources to output a higher DC output voltage than the DC output voltage from power converters associated with less-preferred power sources. For example, the highest priority power source may have its associated power converter operating at the highest DC output voltage (e.g., 48.1 volts) to preferentially draw power from that source. The next highest priority power source may have its power converter controlled to output power at a next highest output voltage (e.g., 48.0 volts), and the lowest priority power source may then have its power converter outputting the lowest voltage (e.g., 47.9 volts). In the context of the system of FIG. 1 and according to some embodiments, this prioritized operation may be programmed into power converters 5 themselves, without requiring the supervisory external power system controller 9. Alternatively, the prioritization may be implemented by power system controller 9. In some embodiments, the prioritization is put into effect when the output load is above a certain user-set threshold for the load condition or for the supply condition (for instance, if the solar energy source is above a certain level, e.g., a sunny day and the solar panels exhibit enough current).

Input Power Source Detection and Power Converter Control

Figure 2B:
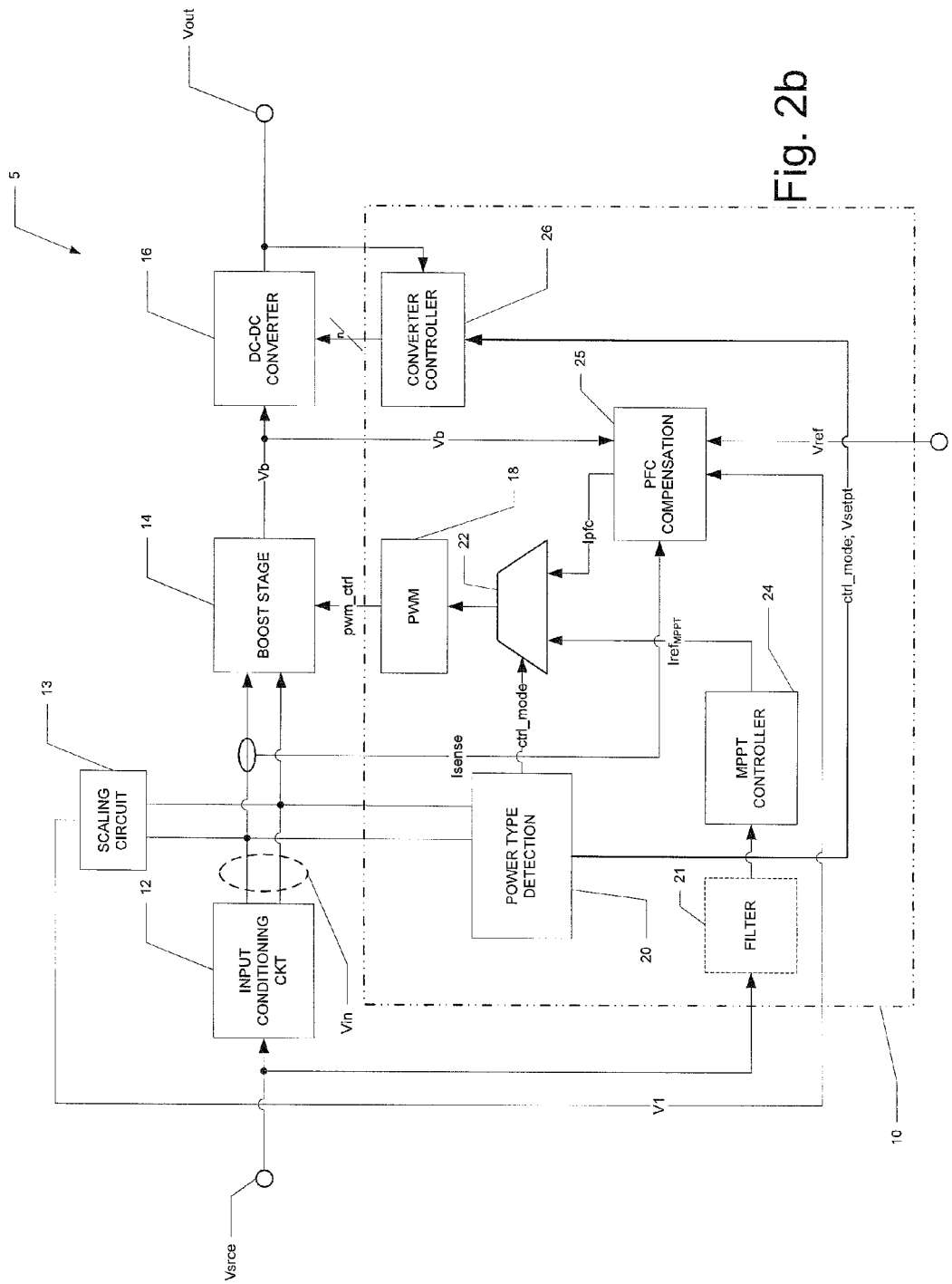
Figure 2C:
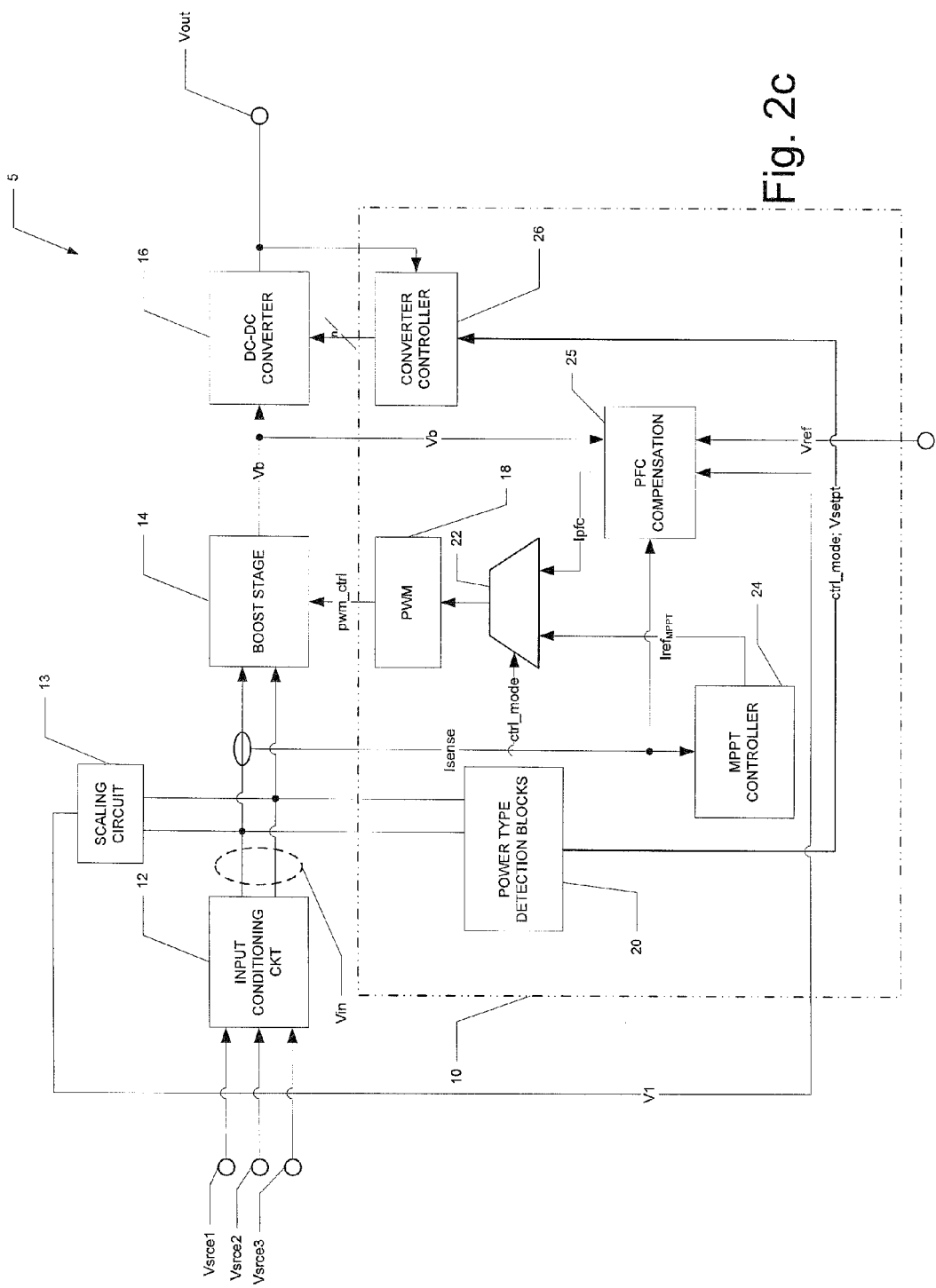

Referring now to FIGS. 2a, 2b, and 2c, the construction of power converter 5 according to the embodiments disclosed in this specification will now be described. In this example, power converter 5 receives power from a corresponding power source 2, 4, 6 at terminal Vsrce. Input conditioning circuit 12 is connected to terminal Vsrce as shown, and is constructed in the conventional manner to filter and to suppress and reduce electromagnetic interference (EMI), power surges and inrushes. In another embodiment, the input conditioning circuit 12 optionally comprises sections that are devoted to AC or DC type inputs. The section for DC may be constructed in the conventional manner to suppress and reduce input noise, power surges and inrushes, and the like. It may optionally include circuitry to include or isolate sections of this circuit based on input source type optionally indicated from power type detection circuit 20. Depending on the type of input power source connected to terminal Vsrce, the power received at terminal Vsrce may be AC power at a relatively stable frequency (e.g., 50 Hz or 60 Hz) such as received from AC grid 2 or a diesel generator, AC power at either constant or somewhat variable frequency such as generated by wind-powered generator 6, or DC power such as generated by solar cell array 4. The input may comprise multiple pins. In some embodiments, multiple types of input may be connected to multiple input pins as shown in FIG. 2c. In this situation, there are multiple blocks of input conditioning circuits 12, scaling circuits 13, and power type detection blocks 20. The control will select the most preferred and most available source type and operate to optimize renewable energy harvest and system reliability. In this embodiment, power converter 5 is a two-stage converter, including a first stage of boost stage 14 followed by a secondary stage of a (e.g. isolating) DC-DC converter stage 16. Together, the boost stage 14 and the DC-DC converter 14 are termed a power converter circuit. Conditioned input power Vin, which is in the same general form as the power received at terminal Vsrce, is presented by input conditioning circuit 12 to boost stage 14. As will become apparent from the following description, boost stage 14 operates to produce a voltage at DC bus Vb that is typically higher than the voltage of the power received at terminal Vsrce. It is contemplated that, in many realizations, the voltage at DC bus Vb may be on the order of 380 to 400 Vdc.

Figure 3A:
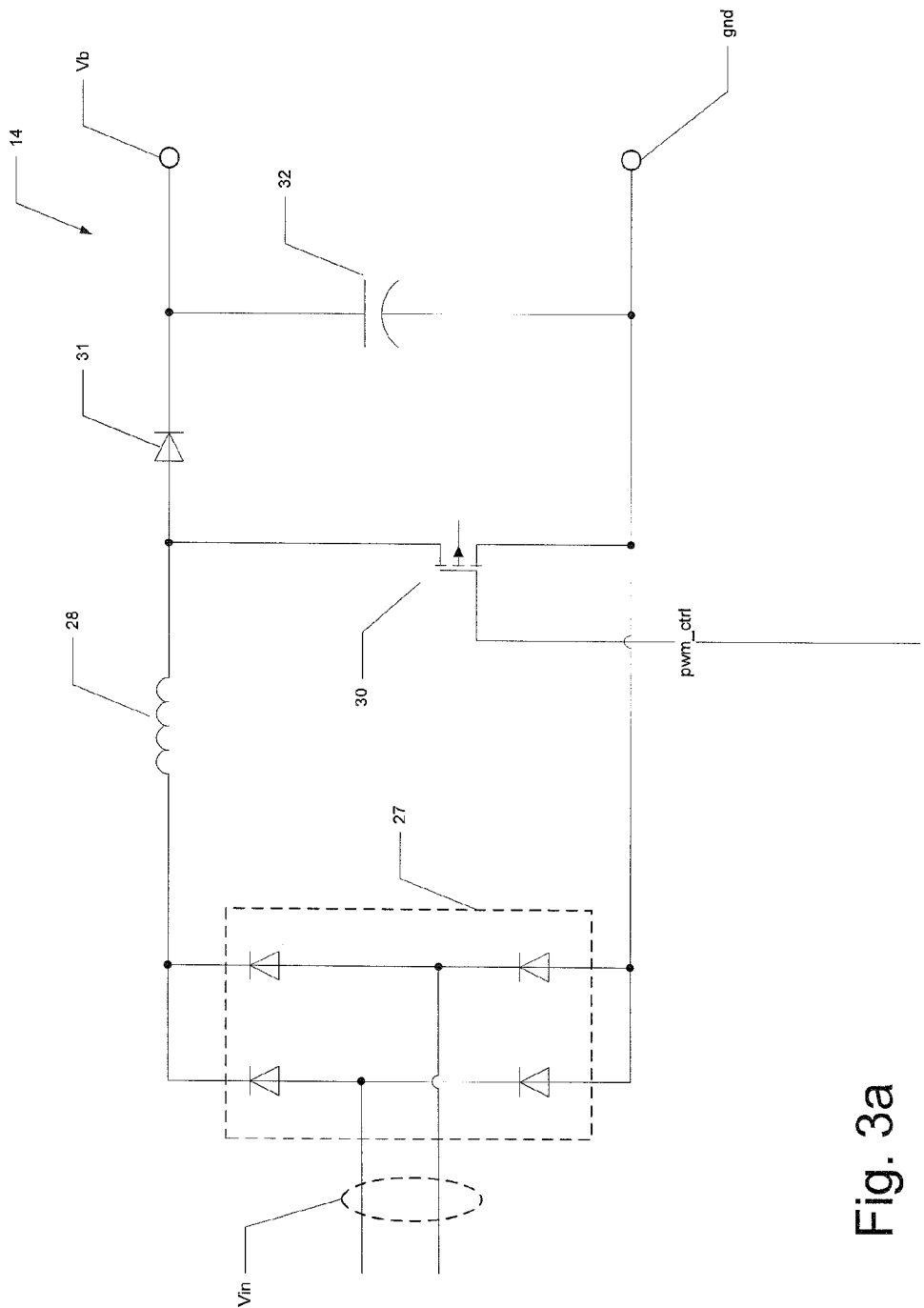
FIG. 3a is an electrical diagram, in schematic form, of a boost stage as useful in the power converter of FIGS. 2a, 2b, and 2c.

FIG. 3a illustrates an example of the construction of boost stage 14, as suitable for use in connection with these disclosed embodiments. While this particular construction of boost stage 14 follows conventional design for boost stages; it is contemplated that boost stage 14 may alternatively be constructed according to any one of a number of other design approaches known in the art or as may be subsequently developed for such boost stages. In the example of FIG. 3a, input terminals Vin are connected to diode bridge 27, which operates as a half-wave rectifier in the conventional manner. Diode bridge 27 is connected to one side of inductor 28, and via flyback diode 31 to DC bus Vb. The other side of inductor 28 is connected via the source/drain path of field-effect transistor 30 or any similar controlled switch to the opposite side of diode bridge 27. Capacitor 32 is connected between DC bus Vb and the ground terminal. Control line pwm_ctrl is connected to the gate of transistor 30, and as such controls the delivery of energy to DC bus Vb in the conventional manner. To summarize, energy is delivered via diode bridge 27 to inductor 28 while transistor 30 is turned on by line pwm_ctrl; while transistor 30 is turned on, energy stored in inductor 28 is delivered through flyback diode to capacitor 32, and thus to DC bus Vb. The voltage at DC bus Vb varies with the duty cycle of the control signal on line pwm_ctrl.

Referring back to FIGS. 2a, 2b, and 2c, pulse width modulator 18 produces pulses on line pwm_ctrl to boost stage 14 in response to one of at least two control circuits, as selected by select circuit 22 and forwarded to pulse width modulator 18. In this embodiment, select circuit 22 has one input receiving control signal $Iref_{MPPT}$ from maximum power point tracking (MPPT) controller 24, and another input receiving control signal $Iref_{PFC}$ from power factor correction (PFC) compensation circuit 25. The power factor correction (PFC) compensation circuit 25 is a feedback control system ensuring that the boost stage 14 output voltage is regulated according to setpoint and optionally ensuring a high power factor if the input source is AC according to power type detection circuit 20. Select circuit 22 has a select input receiving select signal ctrl_mode from power type detection circuit 20, which optionally in combination with control signals from other blocks such as MPPT controller 24, and PFC compensation 25, controls which of those two inputs will be forwarded to pulse width modulator 18. The construction of examples of MPPT controller 24 and PFC compensation circuit 25 will be described in further detail below, it being understood that the particular arrangement of these functions may vary widely according to known architectures. As will be described in further detail below, when select circuit 22 enables control of pulse width modulator 18 by MPPT controller 24, boost stage 14 is controlled to maximize the energy harvested from the input power sources (e.g., renewable power sources). When select circuit 22 enables control of pulse width modulator 18 by PFC compensation circuit 25, boost stage 14 is controlled to limit boost stage output voltage Vb if input type is dc or operate at a near-unity power factor in converting power from the AC grid or diesel generators. In other words, according to these disclosed embodiments, the operation of boost stage 14 is controlled in a manner that depends upon the nature of the power received at terminal Vsrce, and thus according to the type of power source delivering that energy.

As shown in FIGS. 2a, 2b, and 2c, DC-DC converter stage 16 converts the DC bus voltage Vb from boost stage 14 into the eventual output DC voltage presented at terminal Vout, which is connected to output bus VDCout (FIG. 1). As will become apparent from the following description, DC-DC converter stage 16 galvanically isolates output terminal Vout from DC bus Vb within power converter 5, and thus from the power source 2, 4, 6 associated with power converter 5, to prevent propagation of faults as known in the art.

FIG. 3b illustrates an example of the construction of DC-DC converter stage 16 as suitable for use in connection with these disclosed embodiments, according to a conventional design; alternatively, DC-DC converter stage 16 may be constructed according to any one of a number of other design approaches known in the art or as may be subsequently developed for such secondary stages. In the example of FIG. 3b, the output of boost stage 14 at DC bus Vb is received by an inverting substage including capacitor 34 connected in parallel with the series-connected source/drain paths of field-effect transistors Q1, Q2. This inverting substage also includes inductor 36 and capacitor 38 connected in series between the node between transistors Q1, Q2, and the primary of transformer 40. In a rectifying substage of DC-DC converter stage 16, the secondary legs of transformer 40 are connected through transistors Q3, Q4, respectively, to ground, with the center tap connected to one plate of capacitor 42, and via diode 43 to output terminal Vout.

In its general operation, DC-DC converter 16 responds to the switching of transistors Q1, Q2 to produce an AC current from the DC voltage at DC bus Vb. That AC current is conducted through the primary of transformer 40 and inductively coupled to the legs of the center-tapped secondary of transformer 40. The switching of transistors Q3, Q4, produces a rectified DC voltage at output terminal Vout from that secondary current. Transistors Q1 through Q4 are switched by control signals from converter controller 26 in response to differences between the voltage at output bus Vout and a setpoint voltage. According to these disclosed embodiments, the manner in which converter controller 26 operates depends upon the nature of the power received at terminal Vsrce, and thus depends upon the type of power source delivering that energy, as detected by power type detection circuit 20 and communicated to DC-DC converter stage 16 by way of control signals. In some embodiments, converter controller 26 controls DC-DC converter stage 16 to use feedback control to regulate the output voltage appearing at terminal Vout for some power sources (e.g., the AC grid and diesel generators), and to operate DC-DC converter stage 16 in an "open loop" fashion, for example at its resonant frequency of the inductor 36 and capacitor 38 and with boost stage 16 regulating the output voltage, for power from other power sources (e.g., renewable power sources).

It is contemplated that power converter 5 of FIGS. 2a, 2b, and 2c may be implemented in any one of a number of physical implementations. In particular, it is contemplated that and particularly the control circuitry including any or all of power type detection circuit 20, MPPT controller 24, PFC compensation circuit 25, converter controller 26, pulse width modulator 18, and select circuit 22, may be realized in the digital domain, for example by one or more single or multiple chip digital signal processor (DSP) 10 as indicated in FIGS. 2a, 2b, and 2c. If implemented in that manner, DSP 10 would include the necessary programmable logic circuitry or other programmable logic such as field programmable gate array (FPGA) for executing corresponding program instructions to carry out the functions corresponding to those circuits as described in this specification; volatile and non-volatile program and data memory storing those program instructions to be executed may reside within DSP 10 itself, or may be stored in a memory resource (not shown) external to DSP 10. Other functions within power converter 5, including boost stage 14 and isolating DC-DC converter stage 16 will typically be realized by discrete components, especially considering the high power levels that are the subject of the power conversion, and the inductors and transformers implemented in those stages.

As noted above, the manner in which boost stage 14 and DC-DC converter stage 16 are controlled depends on the type of power source to which power converter 5 is connected. According to these disclosed embodiments, power type detection circuit 20 determines the type of power source at its input from the behavior of the received source power. Conventional solar cell arrays 4 typically generate DC power, with the power output depending on the intensity of the solar energy being converted. Wind-powered generators 6 typically generate AC power, but at a relatively constant or variable frequency that varies with wind velocity. Power from the AC electrical grid, or from diesel generators, is typically at a relatively constant frequency, for example 50 Hz or 60 Hz. Other power sources may supply power that have a signature similar to these, or may have a different behavior from these types. In various embodiments, the power type detection circuit 20 is constructed and operates to identify various power source types from these attributes, as will now be described relative to FIGS. 4a through 4c.

Figure 4A:
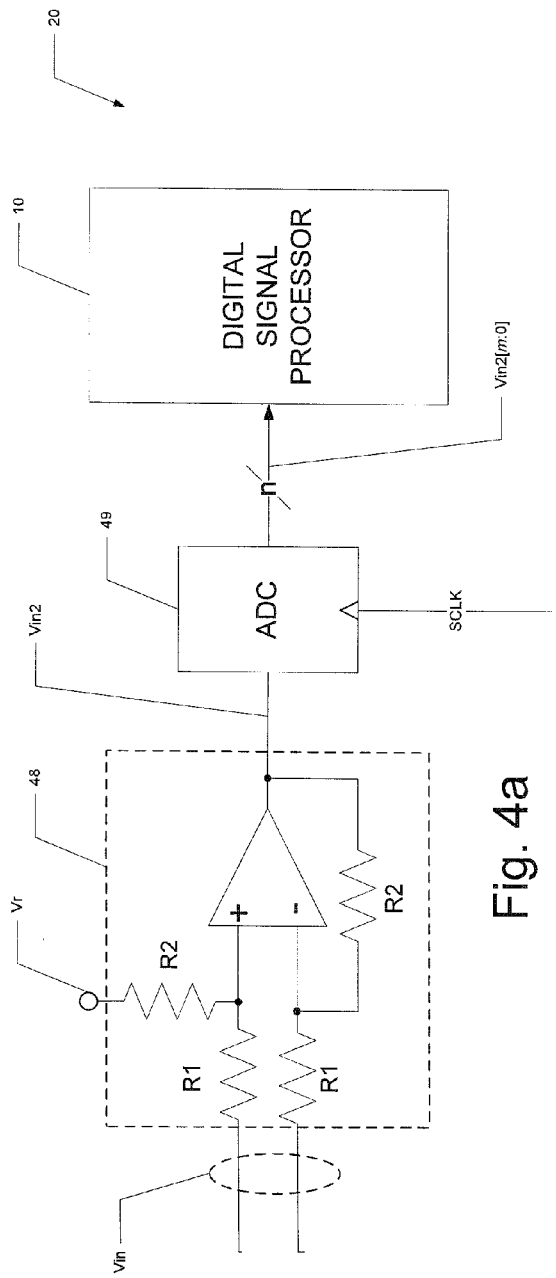
FIG. 4a is an electrical diagram, in block and schematic form, of an AC/DC detection circuit in the power converter of FIGS. 2a, 2b, and 2c.
Figure 4B:
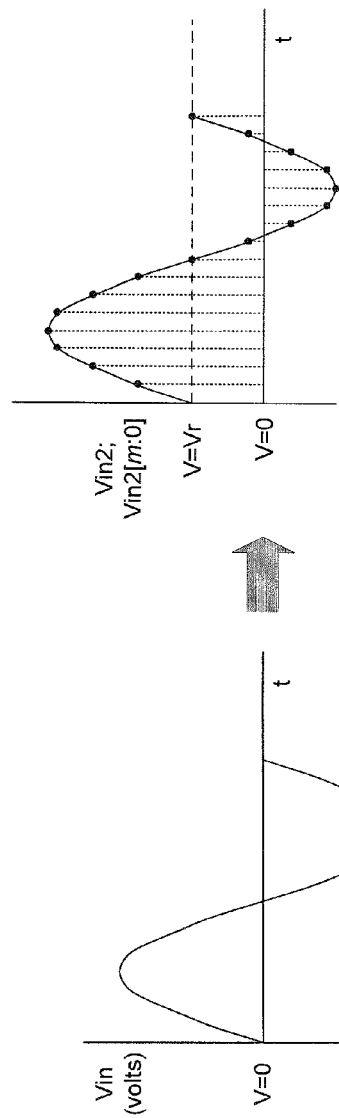

FIG. 4a illustrates the construction of power type detection circuit 20 according to an embodiment. Power type detection circuit 20 includes conventional differential amplifier circuit 48 having an (non-inverting) input coupled to the tap of a voltage divider between a reference voltage Vr and one of the input voltage Vin lines, and another (inverting) input connected to a tap of a voltage divider between the other input voltage line and the output of the operational amplifier itself. As shown in FIG. 4b, voltage Vin2 at the output of differential amplifier 48 follows the voltage of conditioned input voltage Vin, but with its DC level shifted by reference voltage Vr. Analog to digital converter (ADC) 49 samples voltage Vin2 at the output of differential amplifier at the sampling frequency of sampling clock SCLK, and presents digital words Vin2[m:0] representative of those samples to DSP 10. In this embodiment, DSP 10 is programmed to analyze the sample stream from ADC 49 to determine the nature of the power received by power converter 5 at its input, based on the behavior of the samples Vin2[m:0]. This may alternatively be constructed according to any one of a number of other design approaches known in the art or as may be subsequently developed for such discrete sampling stages.

Figure 4C:
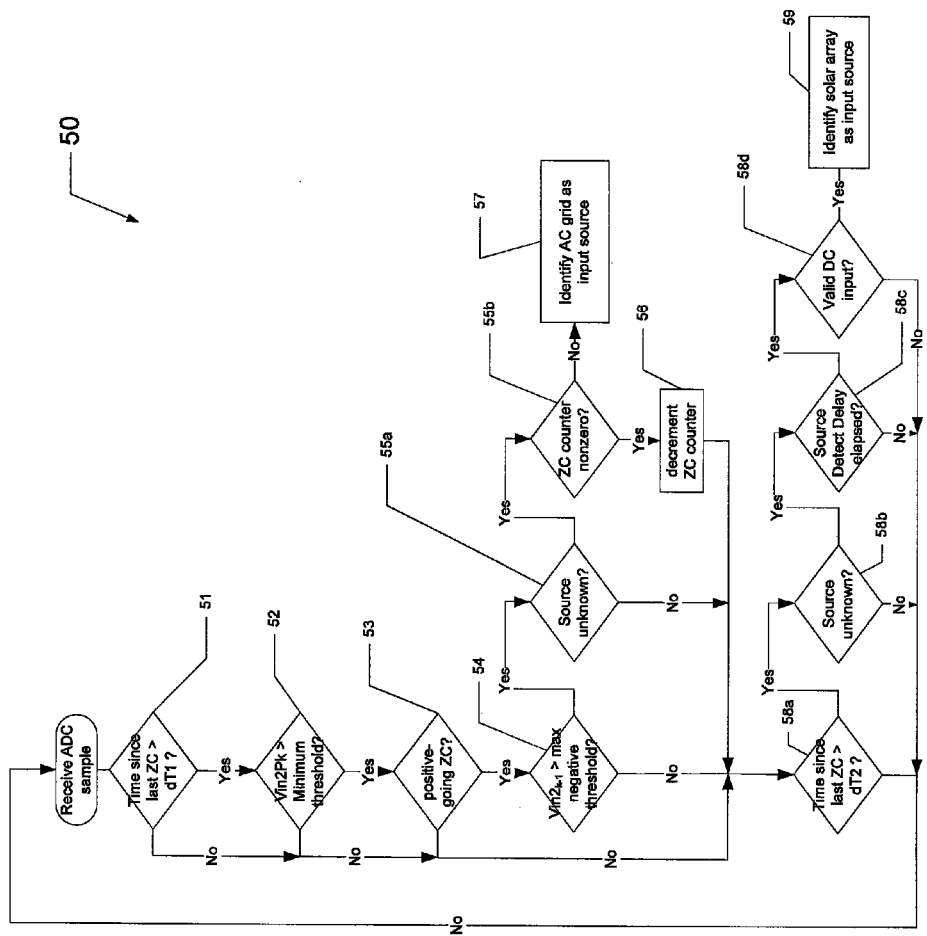

FIG. 4c illustrates an example of power source identification process 50 as carried out by power type detection circuit 20 to identify the type of power source as either AC grid 2 or solar cell array 4 based on attributes of the received input power, according to an embodiment. It is contemplated that this process can be extended, i.e. the process of FIG. 4c to also identify wind-powered generator 6 as a power source. The example shown in FIG. 4c corresponds to the construction of power type detection circuit 20 described above relative to FIGS. 4a and 4b, in which ADC 49 produces a sample stream of samples Vin2[m:0] based on the input voltage received by power converter 5. Process 50 as shown in FIG. 4c thus begins with the receipt by DSP 10 of a sample from ADC 49, and is repeated for each received sample until identification has been attained.

According to this embodiment, power type identification process 50 is based on detection of zero voltage crossings of voltage Vin2. In decision 51, DSP 10 determines, from the received sample stream, whether the time since the last zero crossing of voltage Vin2 (or since power-up of power converter 5, as the case may be) exceeds a first threshold time interval dT1. Threshold time interval dT1 is a preselected duration based on such parameters as the maximum expected frequency of input AC power, the sample rate, truncation error of ADC 49, and other similar factors; decision 51 thus determines whether the most recent zero crossing of voltage Vin2 is sufficiently later than a zero crossing point to accurately analyze. If so (decision 51 is "yes"), DSP 10 executes decision 52 to determine whether the peak voltage Vin2Pk of voltage samples Vin2[m:0] since the last zero crossing exceeds a minimum threshold, to ensure sufficient input voltage for analysis. If so (decision 52 is "yes"), decision 53 is executed to determine whether the most recent zero crossing is positive-going (i.e., the waveform is in a positive-going half-cycle), by determining whether the current and previous samples are greater than and less than an offset voltage value, respectively. If so (decision 53 is "yes"), decision 54 is executed to determine whether the previous sample value $Vin2_{k-1}[m:0]$ is above a maximum negative threshold level. Decision 54 is intended to ensure that negative voltage spikes do not enter the power type detection analysis. If decision 54 returns a "yes", analysis of whether the sample stream of voltage Vin2 indicates that AC power is being received is then performed, beginning with decision 55a.

In decision 55a, DSP 10 determines whether the input power source is currently considered as "unknown", meaning that power converter 5 has not previously identified the input power source at its input. If so (decision 55a is "yes"), decision 55b is evaluated to determine whether a certain number of zero crossings have occurred. According to this embodiment, identification of AC grid 2 (or a diesel generator producing 50 or 60 Hz AC power) as the input power source is based on a sufficient number of positive-going zero crossings of sampled voltage Vin2, so that the power source identification is not misled by glitches or spikes. In this example, a zero crossing counter (e.g., a register value) is initialized to a non-zero value (e.g., on the order of ten) upon detection of a power source, and decision 55b determines whether the value of this zero crossing counter is non-zero. If so (decision 55b is "yes"), then the desired number of zero crossings have not yet been detected; the input power source will continue to be considered as "unknown", and the zero crossing counter is decremented in process 56. On the other hand, if the desired number of positive-going zero crossings have been detected (decision 55b is "no"), DSP 10 then identifies the input power source as AC grid 2 in process 57. The zero crossing counter may also be initialized to its non-zero starting value in process 57, for use by other logic in power converter 5 that depends on a zero crossing count.

If any of decisions 52, 53, 54 return a "no" result, or if the zero crossing counter is non-zero as determined in decision 55b (and is decremented in process 56, as noted above), analysis process 50 next determines whether the input power source is a source of DC power, for example solar cell array 4 (FIG. 1). According to this embodiment, decision 58a is executed by DSP 10 to determine whether the elapsed time since the last zero crossing exceeds a second threshold time interval dT2. Threshold time interval dT2 is a preselected duration based on such parameters as the maximum expected frequency of input AC power, the sample rate, truncation error of ADC 49, and other similar factors, but is contemplated to be substantially longer than threshold time interval dT1 of decision 51, for example on the order of tens of milliseconds or even as long as a few seconds. If so (decision 58a is "yes"), decision 58b is then executed to determine whether the input power source is "unknown". If so (decision 58b is "yes"), decision 58c determines whether a preselected source detection delay period following restart of power converter 5 has elapsed, to allow for the discharge of capacitors in input conditioning circuit 12 (FIGS. 2a, 2b, and 2c), etc. before detecting a potential DC input voltage. If so (decision 58c is "yes"), decision 58d is evaluated to determine whether a valid DC input voltage is indicated by samples Vin2[m:0]. For example, decision 58d may determine whether voltage Vin2 has been above a minimum threshold voltage level for a selected time duration based on the minimum expected frequency of potential AC power sources (e.g., wind-powered generator 6, AC grid 2), the sampling rate of ADC 49, and other relevant factors. It is contemplated that this duration may be relatively long, for example on the order of seconds. If so (decision 58d is "yes"), DSP 10 then identifies the input power source as solar cell array 4, in process 59. The zero crossing counter may also be initialized to its non-zero starting value in process 59, for use by other logic in power converter 5 as noted above. On the other hand, if any of decisions 58a through 58d return a "no" result, analysis process 50 will be repeated upon receipt of the next voltage sample Vin2[m:0].

Once the input power source type has been identified for power converter 5, it is contemplated that the identification of the power source type may be stored in non-volatile memory within power converter 5, for retention even after power down. The input power source may become identified as "unknown" only upon an event indicating that power converter 5 may be connected to a different power source, for example upon removal of power converter 5 from its installed location (e.g., from its cabinet).

As mentioned above, additional decisions and processes may be executed by DSP 10 in its function as power type detection circuit 20 in order to identify other power sources. One such example is the identification of wind-powered generator 6 as an input source, by detecting AC power at the input of a variable or constant frequency, and a variable voltage. It is also possible to implement the appropriate DSP algorithm for distinguishing low and variable frequency AC voltages Vin2 source by wind-powered generator 6 from the more steady 50 or 60 Hz behavior of AC grid 2, into power type identification process 50 of FIG. 4c and variations. For example, DSP 10 may carry out conventional digital signal processing (e.g., digital Fourier transforms, etc.) to determine the frequency behavior of the received samples Vin2[m:0]; if a dominant frequency within the expected frequency range for AC grid or diesel generator power (e.g., 60 Hz±a selected tolerance) is exhibited, the input power source can be identified as the AC grid, while if the frequency behavior exhibits lower and more variable frequencies, the input power source can be identified as wind-generated power. It is further contemplated that similar additions and variations to the power detection algorithm for detecting other renewable power sources such as geothermal-powered generators, water-powered generators, and the like.

Other attributes of the received input power may also be analyzed by power type detection circuit 20, and applied to uses other than optimizing control of power conversion. For example, power converter 5 may include a shunting circuit (not shown) that is to operate when a soft DC source, for example a power source that cannot deliver enough current to clear the 20-30 Amp input fuses, is providing the input power to power converter 5. Measuring the voltage across the shunting circuit provides an indication of how soft or stiff (higher current) the power source is. These attributes may be detected by power type detection circuit 20, and the appropriate shunting action applied in response. Alternatively, conventional high voltage DC sources with low source impedance, such as a battery system, over-provisioned AC to DC converters fed from the AC grid, or over-provisioned DC to DC converters fed from a Fuel Cell, such sources commonly used in data centers, may remain in use for "legacy" 48V loads that will continue to exist during the industry transition to high voltage batteries. For these situations, power type detection circuit 20 may be used to detect the source impedance of the power source, and in response qualify a DC input power source as having low sourcing capability (e.g. less than 20 A) and thus using the shunt circuit, or as having high sourcing capability that excludes operation of the shunting circuit, in response to which power converter 5 will be placed into an operating mode as if the input power is received from the AC grid.

According to the disclosed embodiments, power type detection circuit 20 issues control signals that select the manner in which boost stage 14 and DC-DC converter stage 16 are controlled in response to the detected input power source type. Maximum power point tracking ("MPPT") controller 24 is one of the possible control mechanisms for boost stage 14, as discussed above relative to FIGS. 2a, 2b, and 2c. MPPT refers to a technique for maximizing the power harvested from power sources that exhibit current-voltage characteristics in which output voltage falls off as output current increases beyond a certain limit. MPPT control adjusts the effective input current or voltage of the power converter so that the source operates at the "knee" of its current-voltage characteristic, which is the maximum power operating point, and maintains this optimized power output by tracking changes in this maximum power operating point that may occur over time, for example in response to changes at the power source. Various techniques for performing MPPT tracking and adjustment are known in the art. Renewable power sources such as solar cell array 4, wind-powered generator 6, and the like have this behavior. MPPT techniques typically set the power converter operating point near the "knee" of the current-voltage characteristic (i.e., at the highest output voltage before output current drops off appreciably).

Figure 5:
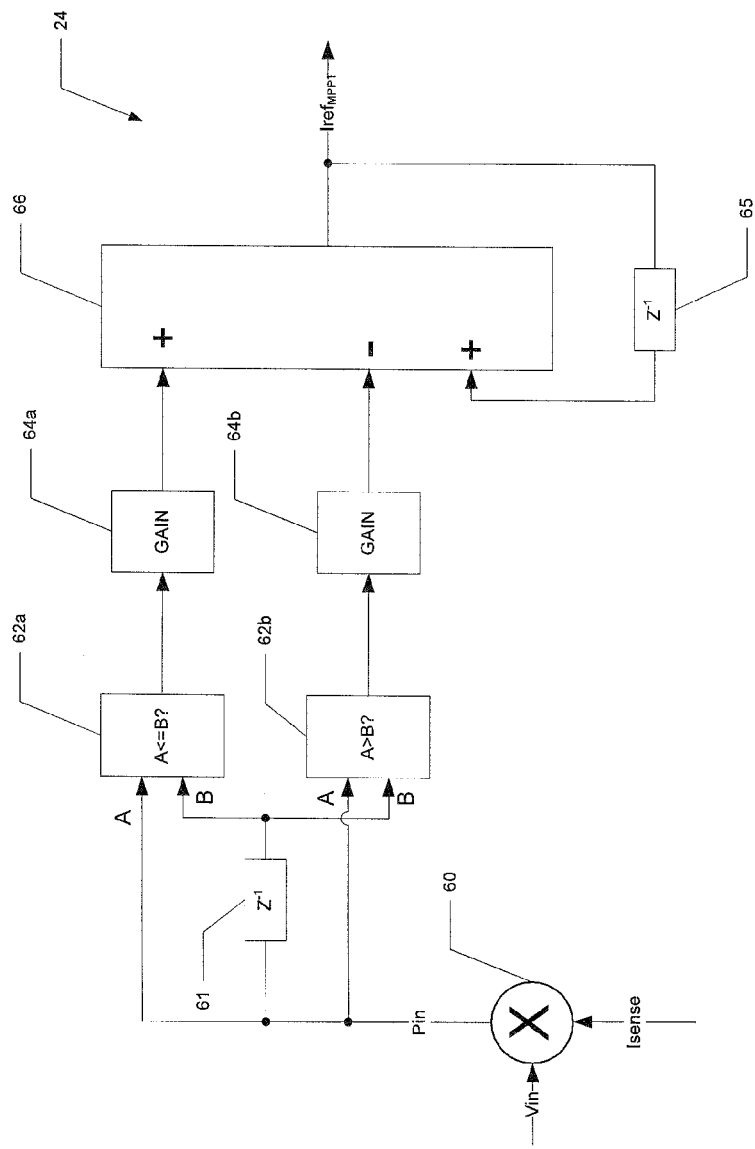
FIG. 5 is an electrical diagram, in block form, of a maximum power point tracking circuit in the power converter of FIGS. 2a, 2b, and 2c.

FIG. 5 illustrates an implementation of MPPT controller 24 in power converter 5 of this embodiment that is particularly suited for digital realization, for example in DSP 10. In this implementation of MPPT controller 24, signal values correspond to sample values, and are propagated through each stage during each sample period. Multiplier 60 generates power product Pin as the product of conditioned input voltage Vin and sensed input current Isense from the output of conditioning circuit 12, and provides that power product Pin to comparators 62a, 62b, and delay stage 61. Each comparator 62a, 62b thus receives the current value of power product Pin at one input and a delayed value (by delay stage 61) of power product Pin at a second input, and presents a logic signal to respective gain stages 64a, 64b based on a comparison of the two. In this example, comparator 62a issues a "true" logic level in response to the current value of power product Pin (at input A) being equal to or less than its previous value (at input B); conversely, comparator 62b issues a "true" logic level in response to the previous value of power product Pin (at input A) being greater than its current value (at input B). Each of gain stages 64a, 64b issue a pulse in response to receiving a "true" logic level at its input. The output of gain stage 6 a drives an "increment" input of output amplifier 66, and the output of gain stage 64b drives a "decrement" input of output amplifier 66. When selected as the control mechanism for boost stage 14, output amplifier 66 drives control current Iref$_{MPPT}$ to pulse width modulator 18 (FIGS. 2a, 2b, and 2c). Delay stage 65 in the feedback loop of output amplifier 66 smoothes transitions of control current Iref$_{MPPT}$.

In operation, therefore, MPPT controller 24 evaluates the power currently being drawn at the input of power converter 5 relative to a prior value of that power. If the current power level value Pin is less than or equal the prior value (i.e., delayed by delay stage 61), comparator 62a outputs a negative value to gain stage 64a, which in turn causes output amplifier 66 to adjust the level of control current $\text{Iref}_{MPPT}$ based on whether $\text{Iref}_{MPPT}$ was increased or decreased in the last perturb iteration. If $\text{Iref}_{MPPT}$ was increased, the gain block 64a will reduce $\text{Iref}_{MPPT}$ and vice versa. This action will draw additional power at the input of power converter 5. If, on the other hand, the current power level value Pin is greater than the previous value, comparator 62b outputs a positive value to gain stage 64b, which in turn causes output amplifier 66 to adjust the level of control current $\text{Iref}_{MPPT}$ based on whether $\text{Iref}_{MPPT}$ was increased or decreased in the last perturb iteration. If $\text{Iref}_{MPPT}$ was increased the gain block 64b will continue to increase $\text{Iref}_{MPPT}$ and vice versa. This action will again increase the power drawn by the input of power converter 5. Eventually, the perturbations or dithering applied by MPPT controller 24 will settle the operating point of power converter 5 near the maximum power point, adjusting that operating point as needed over time.

Other approaches to MPPT control of a power converter are known in the art, including direct measurement of input current and voltage followed by calculation of the maximum power point, and the like. It is contemplated that these alternative approaches are also suitable for use in power converters in these and other embodiments.

Figure 6A:
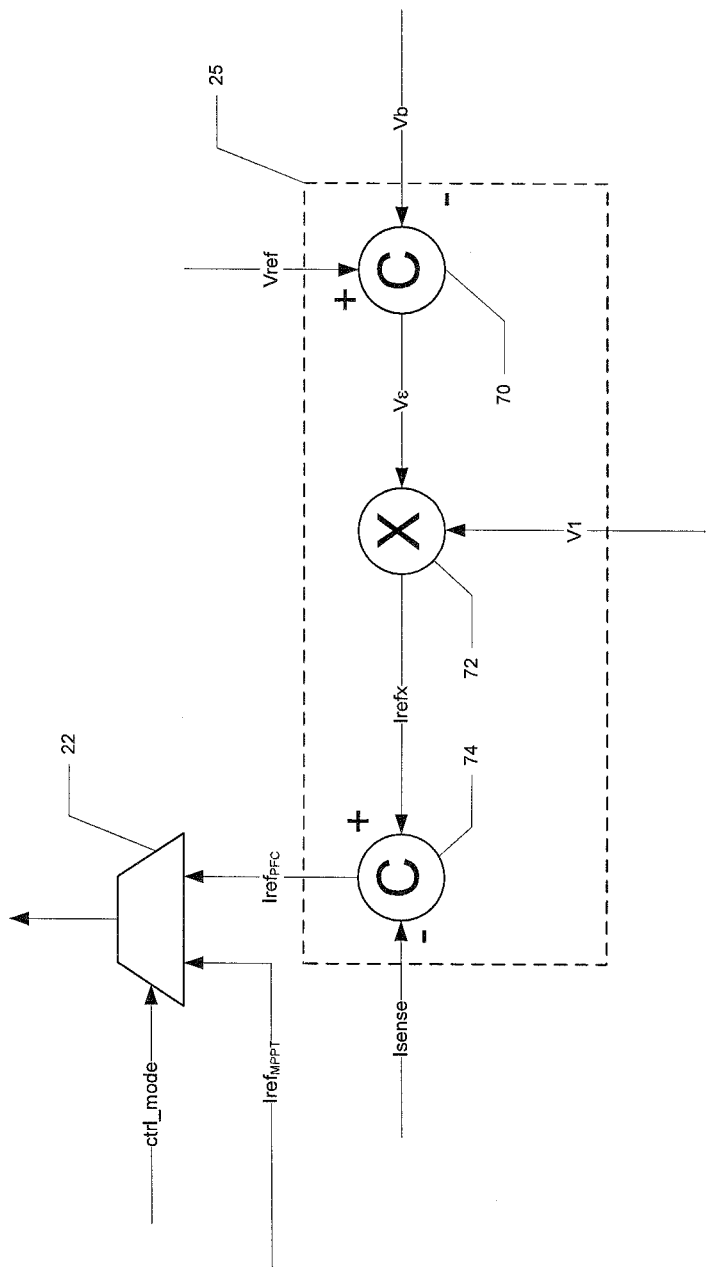
FIGS. 6a through 6b are electrical diagrams, in block and schematic form, of voltage and current control circuitry in the power converter of FIGS. 2a, 2b, and 2c.
Figure 6B:
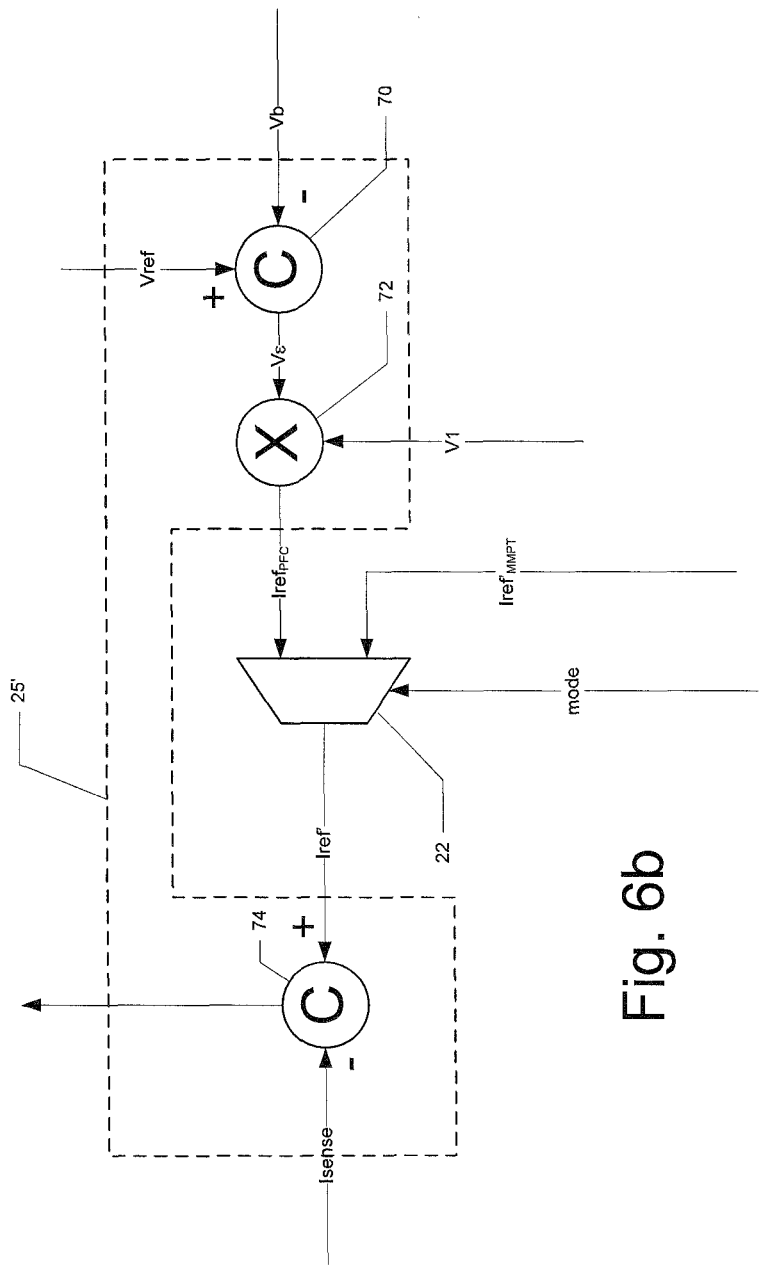
Figure 6C:
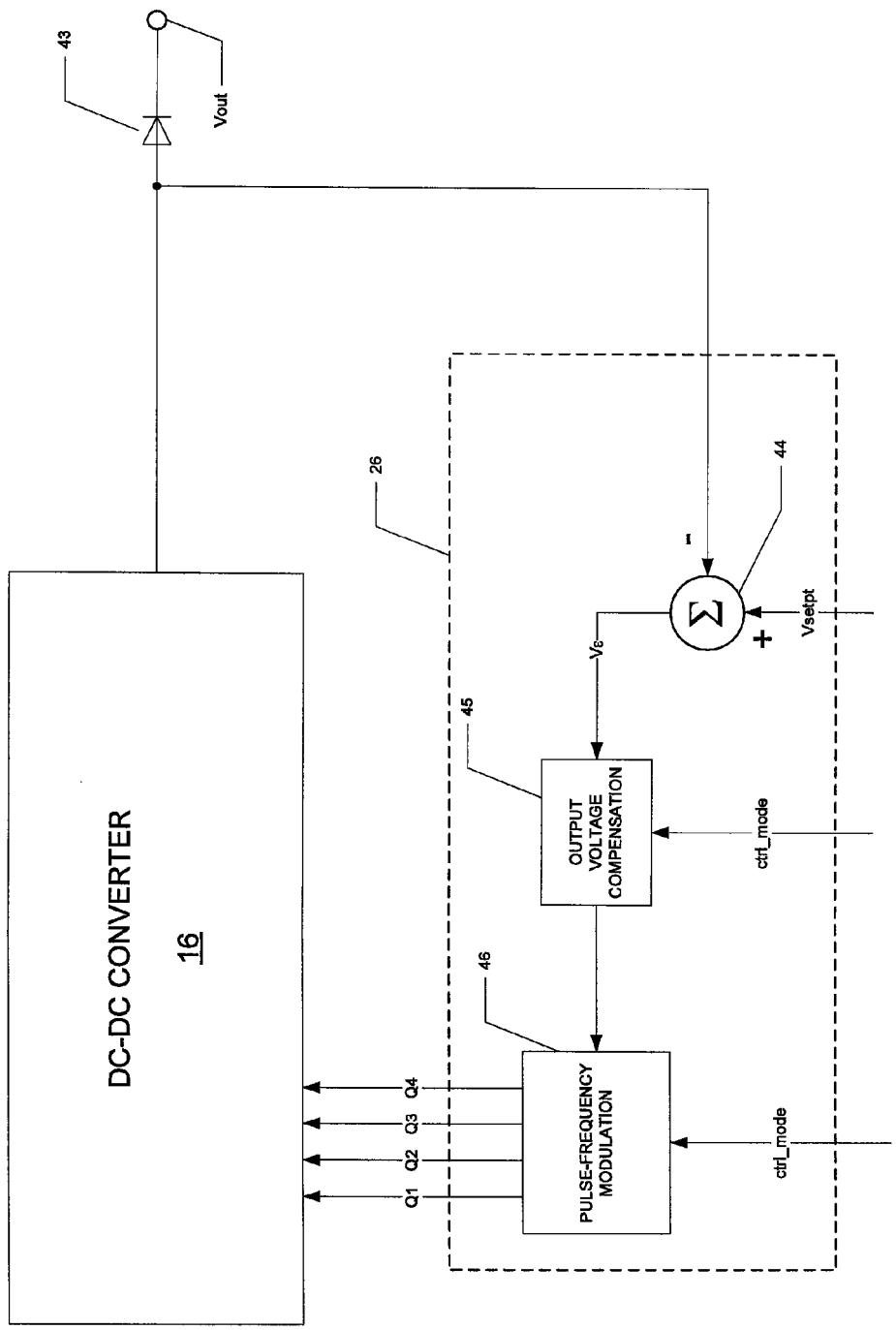
FIG. 6c is a circuit diagram of a DC-DC converter and a converter controller circuitry in the power converter of FIGS. 2a, 2b, and 2c.

According to the disclosed embodiments, PFC compensation circuit 25 provides another available mechanism for the control of boost stage 14. Referring now to FIGS. 6a through 6c, the construction of PFC compensation circuit 25 according to various alternative implementations will now be described. PFC compensation circuit 25 may operate in either the analog or digital domains, depending on the particular implementation.

In the implementation shown in FIG. 2a, PFC compensation circuit 25 produces a control current $\text{Iref}_{PFC}$ and applies that current to one input of select circuit 22. The circuitry deriving this control current $\text{Iref}_{PFC}$ includes voltage compensator 70 (shown as a circle with C in FIG. 6a), which presents an current command Vε corresponding to the difference between reference voltage Vref and the voltage at DC bus Vb at the output of boost stage 14. Reference current generator 72 converts current command Vε to an output current Irefx by multiplication with a scaled voltage V1, from scaling circuit 13, based on conditioned input voltage Vin. Current compensator 74 (shown as a circle with C in FIG. 6a) produces PWM command $\text{Iref}_{PFC}$ based on the difference between current Irefx and sensed input current Isense, and forwards this PWM command $\text{Iref}_{PFC}$ to select circuit 22.

As evident from FIG. 6a and according to known power factor correction techniques, if PFC compensation circuit 25 is selected by select circuit 22, control current $\text{Iref}_{PFC}$ will control the duty cycle of pulse width modulator 18 so that the average current conducted by inductor 28 (FIG. 3a) follows a current (Irefx) that is proportional to the rectified voltage if the input power source is AC. If the input power source is DC, the circuit 25 operates as a feedback control system to regulate Vb. In the case of AC input, boost stage 14 will thus be controlled to operate at a near-unity power factor, in the rectification of AC power received by power converter 5. The ctrl_mode indicates to select circuit 22 the operating mode based on type of input power source and load conditions.

FIG. 6b illustrates of PFC compensation circuit 25' in combination with select circuit 22, according to an alternative implementation. In this arrangement, voltage compensator 70 and reference current generator 72 generate current $\text{Iref}_{PFC}$ as the product of current command Vε and as described earlier optionally scaled input voltage V1. Current $\text{Iref}_{PFC}$ is applied directly to one input of select circuit 22 in this implementation, however, along with current $\text{Iref}_{MPPT}$ from MPPT controller 24. The output of select circuit 22 presents current Iref', which is the selected one of currents $\text{Iref}_{PFC}$ and $\text{Iref}_{MPPT}$ from multiplier 72 and MPPT controller 24, respectively. Current compensator 74 is located downstream from select circuit 22, and generates an output control current according to the difference between the selected current Iref' and sensed input current Isense. It is contemplated that MPPT controller 24 will be coded or otherwise modified to produce its output current $\text{Iref'}_{MPPT}$ at values that account for its subsequent control with sensed input current Isense at current compensator 74.

In one embodiment, the implementations of FIGS. 6a through 6b described above are suited for realization by DSP 10, as each of the operations can be performed in the digital domain in the execution of program instructions corresponding to this function. Of course, PFC compensation circuit 25, in combination with select circuit 22 as desired, may also be realized in alternative arrangements, if desired in particular implementations. It is contemplated, however, that the examples described above relative to FIGS. 6a through 6b are suited for the architecture of power controller 5 as described herein.

FIG. 6c illustrates an example of the construction of converter controller 26 according to the disclosed embodiments. An example of converter controller 26 suitable for use in these embodiments is described in U.S. Pat. No. 7,796,404 B2, issued Sep. 14, 2010, commonly assigned herewith and incorporated herein by this reference. As noted above relative to FIGS. 2a, 2b, and 2c, converter controller 26 controls the operation of DC-DC converter stage 16. In this example, the output of DC-DC converter stage 16 (coupled to output terminal Vout via diode 43) is applied to a negative input of adder 44 while setpoint voltage Vsetpt is applied to a positive input of adder 44. It is contemplated that setpoint voltage Vsetpt will be at a level corresponding to the prioritization of power conversion for various power source types, as described above, and will be communicated to converter controller 26 from power type detection circuit 20, or alternatively from external power converter system controller 9 (FIG. 1). Adder 44 produces error voltage Vε according to the difference between setpoint voltage Vsetpt and the voltage at the output of DC-DC converter stage 16. Output voltage compensation circuit 45 forwards a control signal to pulse-frequency modulator 46, which in turn modulates the switching of transistors Q1 through Q4 in response to the error voltage Vε developed by adder 44. Pulse-frequency modulator 46 controls the gates of transistors Q1 through Q4 of DC-DC converter stage 16 in a pulse-frequency modulated manner; alternatively, the signals to transistors Q1 through Q4 may be generated in a pulse width modulated manner, if desired.

Referring now to FIG. 7 in combination with FIGS. 2a, 2b, and 2c, the overall operation of power converter 5 in adapting the manner in which power is converted according to the type of input power source at its input will now be described, according to these embodiments. This description will refer to the example in which DSP 10 or another programmable logic circuit is used to realize the control functions of power converter 5, it being understood that this description is by way of example only.

Power source identification process 50, for example as described above relative to FIG. 4c, determines the type of input power source to power converter 5, which is determined in decision 75 of FIG. 7, and issues the appropriate signal ctrl_mode to select circuit 22 in response to that result. As described above, identification process 50 makes this determination by evaluating attributes of the received power such as frequency (including whether the input power is DC or of variable frequency), whether the received power varies in voltage or power, and the like, so as to distinguish "renewable" input power sources (e.g., solar cell array 4, wind-powered generator 6, geothermal-powered generators, water-powered generators, etc.) from the stable power applied from AC grid 2 or a fossil-fueled generator. According to these embodiments, if decision 75 determines that the input power source is of a "renewable" type, select circuit 22 selects MPPT controller 24 as the source of control signals to pulse-width modulator 18, in process 76. In the arrangement of FIGS. 2 and 6a, this selection is performed by select circuit 22 forwarding control current $Iref_{MPPT}$ from MPPT controller 24 to pulse-width modulator 18. Boost stage 14 will then be controlled to maximize the power harvested from the input power source according to the MPPT algorithm, typically by selecting and enforcing an operating point at which conditioned voltage Vin is at its highest available level before the current drawn from the input power source falls off appreciably.

In this embodiment, and also in response to decision 75 determining that the input power source is of a renewable type, power type detection circuit 20 forwards control signals (e.g., signal ctrl_mode and the like) to converter controller 26 that are indicative of the detected power source type, in process 78. More specifically, power type detection circuit 20 controls converter 26 to operate DC-DC converter stage 16 in an "open loop" manner in response to decision 75 and load conditions determining that the input power source is of a renewable type (e.g., solar cell array 4 or wind-powered generator 6 in FIG. 1). For DC-DC converter stage 16 under pulse-frequency modulation control (FIG. 6b) and constructed as a resonant converter, such as the "LLC" construction of the example shown in FIG. 3b, pulse-frequency modulator 46 will issue gate signals Q1 through Q4 at a frequency near the resonant frequency of DC-DC converter stage 16, to maximize the gain of the inverting substage of converter 16. It is contemplated that the "nearness" of this operating frequency to the resonant frequency of DC-DC converter stage 16 is similar to that attained in conventional resonant control of LLC type DC-DC converter stages, typically at frequencies slightly above the resonant frequency (e.g., between 1.0 and 1.2 times the resonant frequency), as known in the art. In this "open loop" or resonant operation of DC-DC converter stage 16, the output voltage at terminal Vout will effectively be controlled by the boost voltage at DC bus Vb.

In some embodiments, including those described below, output voltage compensation function 45 (FIG. 6c) will be controlled to respond only to negative values of error voltage Vε (i.e., output voltage at terminal Vout being greater than a setpoint voltage Vsetpt for the power source).

If decision 75 determines that the input power source is AC grid 2, or another non-renewable or "fossil fueled" AC power source such as diesel generators, for example by detecting a relatively steady level of AC input power within a given frequency range (e.g., 50 Hz or 60 Hz), the control signals issued by power type detection circuit 20 cause select circuit 22 to select PFC compensation circuit 25 as the source of control signals to pulse-width modulator 18, in process 77. In the arrangement of FIGS. 2 and 6a, select circuit 22 selects control current $Iref_{PFC}$ from adder 74 in PFC compensation circuit 25 to control pulse-width modulator 18. Under this PFC control, boost stage 14 will be controlled to have an operating point at a near-unity power factor, by controlling the average current conducted by inductor 28 of boost stage 14 (FIG. 3a) to follow a current (Iref) that is proportional to the rectified voltage.

Also in response to decision 75 indicating that the detected input power source is AC grid 2, an AC diesel generator, or the like, power type detection circuit 20 issues the appropriate control signals to converter controller 26 to operate DC-DC converter stage 16 in an "closed loop", or feedback controlled manner, relative to the desired output voltage indicated by setpoint voltage Vsetpt. For the example of DC-DC converter stage 16 of FIG. 3b and converter controller 26 of FIG. 6c, the control signals from power type detection circuit 20 enable output voltage compensation circuit 45 to respond to both positive and negative values of error voltage Vε. In this example, this control will either advance or retard the frequency at which pulse-frequency modulator 46 issues gate signals Q1 through Q4 according to whether the current output voltage exceeds or is below the desired setpoint voltage Vsetpt for power converter 5.

The combination of PFC control of boost stage 14 and feedback control of DC-DC converter 26 results in near-unity power factor for boost stage 14, with the secondary stage of DC-DC converter stage 16 controlling the output voltage at terminal Vout to the desired level.

Therefore, the manner in which power converter 5 is operated according to these embodiments is selectably controlled according to attributes of the received input power, and thus according to the type of input power source to which power converter 5 is connected. This selectable control not only maximizes the efficiency with which power converter 5 is operated for a range of input power sources, but allows a common construction of power converter 5 to be used in converting power from that wide range of input power sources, as compared with conventional systems that include power converters of dedicated construction for converting power for each of the various input power source types. Furthermore, power converters 5 may be themselves programmed to operate at the correct operating point (e.g., setpoint voltage Vsetpt) without requiring an external controller in the power conversion system. The implementation of power converter systems, such as at remote cell tower and other load locations, is thus facilitated.

Variable Load Detection and Power Converter Control

It has been observed that the operation of some power converter installations involves significant complications. Because the amount of power produced by renewable sources such as solar cell array 4 and wind-powered generator 6 is variable and depends on external conditions beyond the control of the power converter system, these renewable sources may generate more power than can be consumed by load LD. This is not a problem if the power converter system includes an inverter coupled to the AC grid, as excess power not consumed locally can be sourced to the grid. In other installations, such as the system shown in FIG. 1, battery backup system 8 serves as a "tank" for any excess power produced by power converters 5 from solar cell array 4, wind-powered generator 6, and other renewable sources that cannot be consumed by a local load LD, at least as long as the battery is fully charged. However, some installations are not coupled to the AC grid, and either may not include battery backup system 8 or include another tank function to which excess power can be "dumped" once the battery is fully charged. In any case, excess generated power that is not consumed by load LD is dissipated safely to avoid damage to the system.

This difficulty is exacerbated in those installations in which the power requirements of load LD are also variable. For example, the load demand of "WiMax" base stations is variable, as it depends on the level of network traffic through that base station. Variability in both the sourced power and the load being variable makes it likely that the converted power exceeds the load requirements from time to time. Variability in the power used by the load should also have good dynamic bandwidth of the power converter system, enabling rapid response to changing load conditions.

As described above, it is desirable to control the power converter to maximize the power drawn from renewable power sources such as solar cell array 4 and wind-powered generator 6. This maximized power harvesting is attained by operating boost stage 14 in corresponding power converters 5 according to a maximum power point tracking algorithm and circuit function, and by operating DC-DC converter stage 16 in "open loop" (e.g., resonant) fashion to apply that maximum harvested power to output terminal Vout. According to the embodiments described below, the manner in which stages 14, 16 are controlled also depends on the conditions at load LD, enabling the power converter system to respond to load conditions relative to the level of harvested power.

Figure 8:
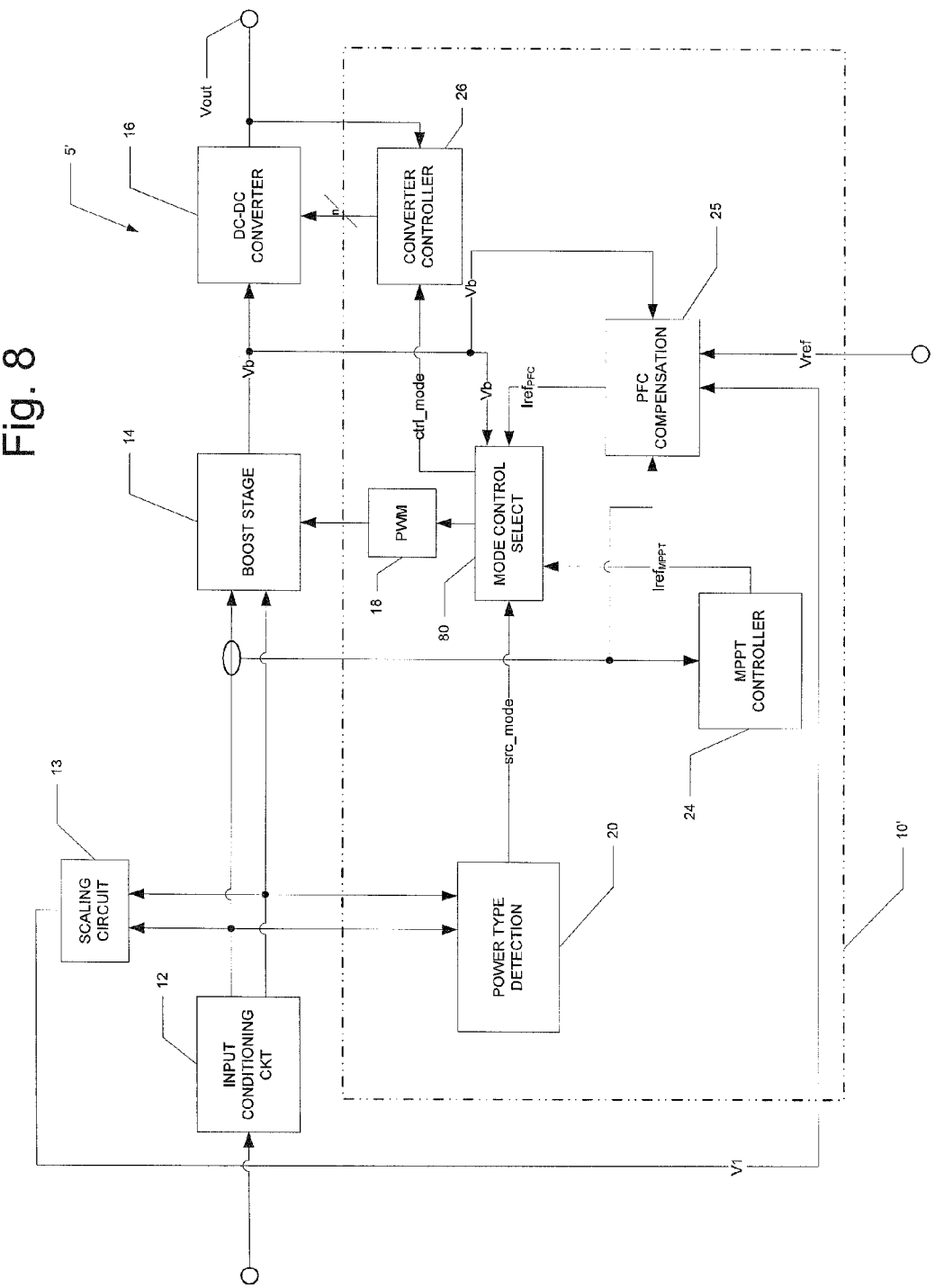
FIG. 8 is an electrical diagram, in block form, of a power converter in the system of FIG. 1.

FIG. 8 illustrates the architecture of power converter 5' constructed according to an embodiment in which the ability to respond to load conditions is provided. The construction of power converter 5' is similar to that of power converter 5 described above in connection with FIGS. 2a, 2b, and 2c, with similar components indicated by the same reference numerals in FIGS. 2a, 2b, 2c, and 8. As shown in FIG. 8, however, power converter 5' includes mode control select function 80, which has an input receiving the voltage at DC bus Vb, in response to which the manner in which pulse width modulator 18 is controlled will be selected, as will be described below. As described above, it is contemplated that control functions such as any or all of power type detection circuit 20, MPPT controller 24, PFC compensation circuit 25, converter controller 26, pulse width modulator 18, can be realized in the digital domain, for example by programmable logic executing program instructions corresponding to those functions. In such an implementation, it is contemplated that mode control select function 80 of power converter 5' can readily be implemented by way of program instructions executed by circuitry within one or more single or multiple chip digital signal processor (DSP) 10' as shown in FIG. 8, responding to samples of the voltage at DC bus Vb acquired by an instance sampling circuitry and analog-to-digital converter circuitry, constructed and operable in similar manner as described above relative to FIG. 4a. In another variation, the appropriate program instructions can carry out the operations of mode control select function 80 described herein; alternatively, the mode control select function 80 can be implemented in custom logic or hardware.

As shown in FIG. 8, mode control select function 80 receives signal src_mode from power type detection circuit 20, which indicates the type of input power source providing power to power converter 5', in the manner described above; mode control select function 80 also receives the voltage at DC bus Vb as noted above. In response to those inputs, and as will be described in further detail below, mode control select function 80 will select either control current $Iref_{MPPT}$ from MPPT controller 24 or control current $Iref_{PFC}$ from PFC compensation circuit 25 for application to pulse width modulator 18 and thus control of boost stage 14. In addition, mode control select circuit 80 forwards signal ctrl_mode to converter controller 26, so that DC-DC converter stage 16 is operated either in "open loop" fashion or under feedback control, consistent with the selected control mode for boost stage 14.

As described above relative to FIGS. 6a through 6c, the selection of MPPT controller 24 and PFC compensation circuit 25 can be implemented in various ways. While the architecture of FIG. 8 corresponds to the selection of the output control currents $Iref_{MPPT}$, $Iref_{PFC}$ from MPPT controller 24 and PFC compensation circuit 25, respectively, it is of course contemplated that control mode select circuit 80 may be incorporated in alternative ways, such as those described above relative to FIGS. 6b and 6c. As discussed above, the coding or implementation of MPPT controller 24 will differ according to those variations.

Figure 9:
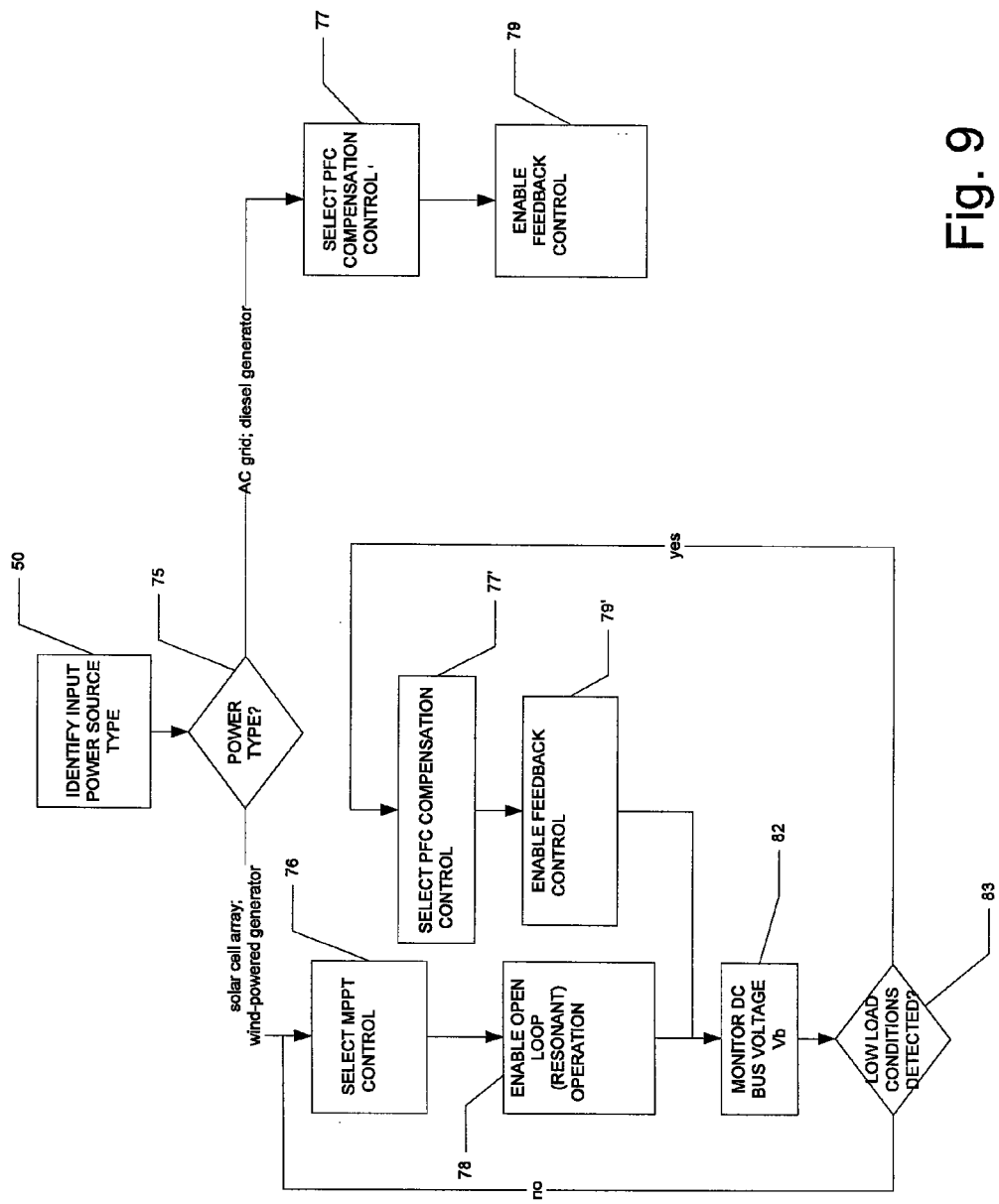
FIG. 9 is a flow diagram illustrating the operation of the power converter of FIG. 7.

FIG. 9 illustrates the overall operation of power converter 5' according to this embodiment. Identification of the input power source in process 50, and control of boost stage 14 and DC-DC converter stage 16 in response to the identified power source type is carried out as before. For the case in which the input power source is AC grid 2 or another fossil-fueled generator, boost stage 14 is controlled from PFC compensation circuit 25 in process 77, and converter controller 26 is enabled to apply feedback control to DC-DC converter stage 16, in process 79. Power converter 5' remains in this mode of operation for these input power sources, as described above.

For the case in which decision 75 determines that the input power source is a renewable energy source, such as solar grid array 4, wind-powered generator 6, and the like, mode control select circuit 80 selects MPPT controller 24 as the control function for pulse width modulator 18 and boost stage 14, in process 76. In process 78, converter controller 26 is instructed to enable open loop operation of DC-DC converter stage 16; for example, DC-DC converter stage 16 constructed in the "LLC" manner would be operated near its resonant frequency. In this mode, the voltage at terminal Vout is controlled by the voltage at DC bus Vb as presented by boost stage 14. However, if the demand for power at load LD falls, the voltage at terminal Vout of power converter 5' will rise; with DC-DC converter stage 16 operating at resonance (i.e., open loop), this will cause the voltage at DC bus Vb to also rise. Power converter 5' operates to prevent this condition from damaging the power converter system.

According to this embodiment, low load conditions are addressed following the control type selections of processes 76, 78, by power converter 5' monitoring the voltage at DC bus Vb in process 82. In decision 83, power converter 5' determines whether a low load condition is present, based on the results of monitoring process 82. If not (decision 83 is "no"), boost stage 14 remains under MPPT control (process 76) and DC-DC converter stage 16 remains operating in open loop (process 78), with periodic monitoring of the voltage at DC bus Vb continuing.

However, if a low load condition is detected (decision 83 is "yes"), power converter 5' changes its mode of control. In process 77', control mode select function 80 selects PFC compensation circuit 25 to control pulse width modulator 18 and thus boost stage 14. And in process 79', control mode select function 80 enables converter controller 26 to apply feedback control of DC-DC converter stage 16, for example relative to a setpoint voltage Vsetpt. In other words, even with an input power source of the renewable type, a drop in demand at load LD will cause power converter 5' to operate in a manner that reduces its output voltage (and power output) to a tolerable level. Boost stage 14 will be set at a sub-optimal operating point, from the standpoint of power harvesting, but power converter 5' will be prevented from damage in this condition. Monitoring process 82 and decision 83 will be repeated, maintaining PFC compensation of boost stage 14 and feedback control of DC-DC converter stage 16. Should conditions at load LD change so as to increase power demand, pulling down the output voltage at terminal Vout, the voltage at DC bus Vb detected by monitoring process 82 may fall sufficiently that the low load condition is no longer detected (decision 83 is "no"). In that event, control of boost stage will return to MPPT controller 24 (process 76) and DC-DC converter stage 16 will be operated in open loop fashion (process 78), again maximizing the power harvested from the renewable input source.

According to this embodiment, various approaches are contemplated for carrying out monitoring process 82 and decision 83, as will now be described relative to FIGS. 10a through 10d. Each of these examples is contemplated to be suitable for implementation in the digital domain, based on periodic samples of the voltage at DC bus Vb and as may be carried out by DSP 10' by executing the corresponding program instructions.

FIG. 10a illustrates a relatively simple example of the determinations of decision 83. A sample of the voltage at DC bus Vb is received in process 82. In decision 85, this sample voltage Vb(k) is compared with a first voltage limit corresponding to reference voltage Vref minus tolerance Tol1. Reference voltage Vref corresponds to the reference voltage used to derive error voltage Vε in PFC compensation circuit 25, as described above relative to FIGS. 6a through 6c. Tolerance Tol1 is a voltage differential to be applied to reference voltage Vref, and will define the DC bus voltage Vb at which MPPT control is again selected for application to boost stage 14. Tolerance Tol1 may be derived as a function of such factors as the open loop turns ratio in the LLC construction of DC-DC converter stage 16, and other tolerances in power converter 5' to prevent premature return to MPPT control following a low load condition. It is contemplated that, in normal operation of power converter 5' from a renewable power source, and under normal load conditions, sample voltage Vb(k) will be above the threshold Vref−Tol1 applied by decision 85.

If such is the case (decision 85 is "no"), decision 89 is next executed to determine whether the voltage at DC bus Vb has risen significantly, such as may occur under a low load condition. In this embodiment, decision 89 is performed by comparing the current sample voltage Vb(k) with a threshold corresponding to reference voltage Vref plus tolerance Tol2. The particular value of tolerance Tol2 will depend on such parameters as the open loop turns ratio in DC-DC converter stage 16, the magnitude of ripple allowed at terminal Vout, and other tolerances; tolerance Tol2 is selected to ensure that power converter 5' changes its control mode well prior to reaching a dangerous condition, but without prematurely changing its control mode. Then, the particular values of tolerances Tol1, Tol2 for specific implementations are identified.

If the DC bus voltage sample Vb(k) is below the threshold Vref+Tol2 (decision 89 is "no"), the current mode of control of power converter 5' is maintained for the current sample period (process 90); upon receipt of the next sample Vb(k) in process 82, the decision process is again repeated. Prior to first detecting a low load condition, and because the input power source has been identified as a renewable source (decision 75 of FIG. 9), MPPT control of boost stage 14 and open loop operation of DC-DC converter stage 16 will remain in force (processes 76, 78).

If the DC bus voltage sample value Vb(k) has risen to above the threshold level Vref+Tol2 (decision 89 is "yes"), for example due to a low load condition, control mode select circuit 80 selects PFC compensation circuit 25 to control pulse width modulator 18, and forwards the appropriate signals ctrl_mode to converter controller 26 to effect feedback control operation of DC-DC converter stage 16, in process 92. As a result, PFC compensation circuit 25 determines its control current $Iref_{PFC}$ in process 94, and that current is forwarded by control mode select circuit 80 to pulse width modulator 18 in the architecture of FIG. 8. These PFC compensation and open loop control modes remain in force during the ensuing sample period (process 90), with the overall decision process repeating from the receipt of the next sampled voltage at DC bus Vb in process 82.

In this embodiment, once PFC compensation and open loop control mode are set in process 92, that control condition will remain until the sampled voltage Vb(k) falls below the threshold of Vref−Tol1 (i.e., until decision 85 is "yes"), even if that voltage again falls below the threshold of Vref+Tol2 (i.e., even if decision 89 becomes "no"). Upon a sample voltage Vb(k) reaching a level below that of threshold Vref−Tol1 (decision 85 is "yes"), control mode select circuit 80 selects MPPT controller 24 as the source of control current to pulse width modulator 18, and forwards the appropriate signals ctrl_mode to converter controller 26 so that DC-DC converter stage 16 operates in an open loop manner, in process 86. MPPT controller 24 determines its control current $Iref_{MPPT}$ in process 88 and, in power converter 5' constructed in the manner shown in FIG. 8, current $Iref_{MPPT}$ is forwarded by control mode select circuit 80 to pulse width modulator 18 for control of boost stage 14. Accordingly, one way of characterizing low load is that the load is low enough to cause the boost output voltage to exceed a preset threshold corresponding to a reference voltage Vref plus a tolerance Tol2.

Thus, upon detection of a renewable input power source by power type detection circuit 20, the operating point of power converter 5' (i.e., the duty cycle of the output of pulse width modulator 18 to boost stage 14, and the frequency at which DC-DC converter stage 16 operates) is selected to harvest the maximum power. If the load demand falls sufficiently (sample voltage Vb(k) rises above Vref+Tol2), process 94 controls DC-DC converter stage 16 to reduce the output voltage at terminal Vout to the setpoint voltage Vsetpt; in the construction of FIG. 6c, pulse frequency modulator 46 accomplishes this by increasing the operating frequency of DC-DC converter stage 16 to above its resonant frequency. Because process 92 enables PFC compensation circuit 25 to control pulse width modulator 18 and because voltage Vb(k) is higher than reference voltage Vref, the resulting negative error voltage Vε reduces control current $Iref_{PFC}$, which in turn reduces the duty cycle at the output of pulse width modulator 18. The voltage at DC bus Vb falls as a result.

Figure 10B:
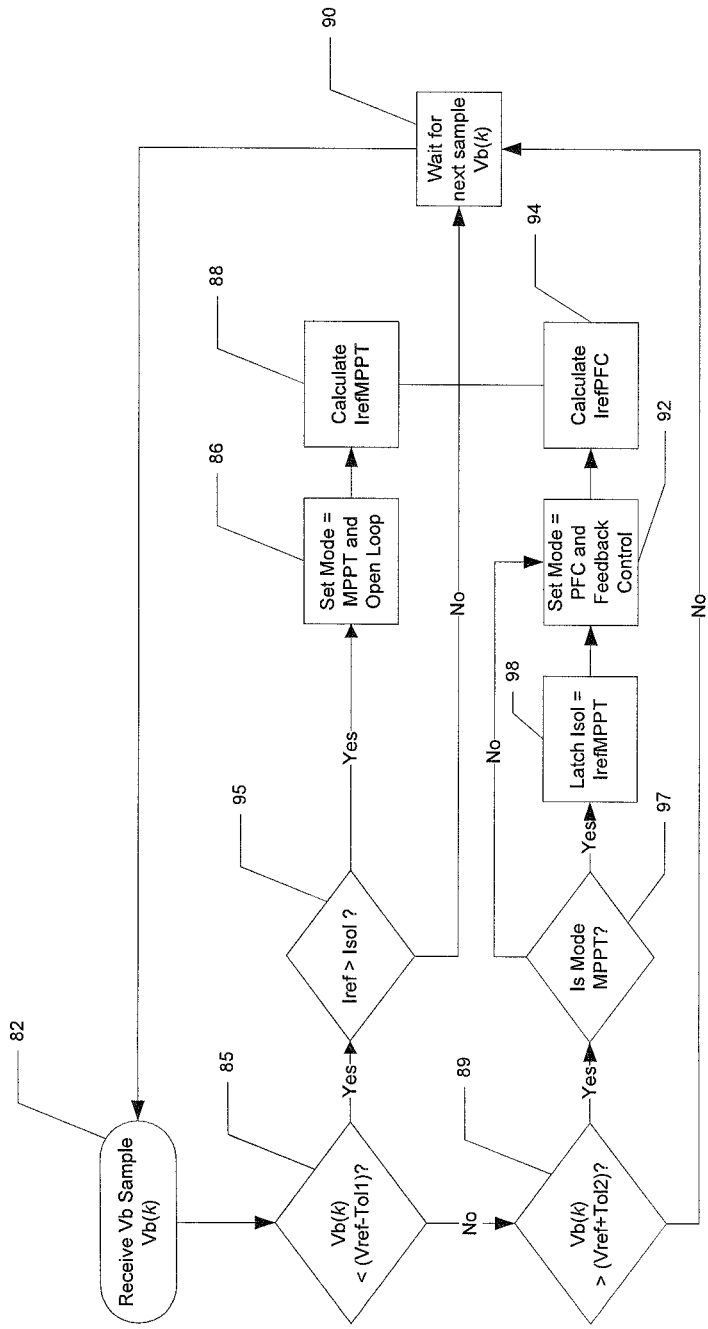

FIG. 10b illustrates another embodiment of decision process 83. In this embodiment, decision process 83 responds to each sample Vb(k) of the voltage at DC bus Vb acquired in process 82 by executing decisions 85, 89 comparing that sample value Vb(k) with the threshold voltages, as in the implementation shown in FIG. 10a.

In this implementation, however, if the sample voltage Vb(k) is not below the threshold voltage of reference voltage Vref minus tolerance Tol1 (decision 85 is "no"), but if the sample voltage Vb(k) has risen to above the threshold level Vref+Tol2 (decision 89 is "yes"), decision 97 is next executed to determine whether control mode select circuit 80 is currently selecting MPPT controller 24. If not (decision 97 is "no"), meaning that power converter 5' is currently in its PFC compensation and open loop control modes, these control modes are maintained by the operation of processes 92, 94 as described above relative to FIG. 10a, and remain in force during the ensuing sample period (process 90). If control mode select circuit 80 is currently selecting MPPT controller 24 (decision 97 is "yes"), the current control current $Iref_{MPPT}$ level is identified and latched as current Isol. Processes 92, 94 are then invoked to place power converter 5' in its PFC compensation and feedback control modes, for at least the next sample period (process 90). Once power converter 5' has been placed into PFC compensation and feedback control mode in process 92, that control condition will remain until the sampled voltage Vb(k) falls below the threshold of Vref−Tol1 (i.e., until decision 85 is "yes"), as described above.

Figure 10C:
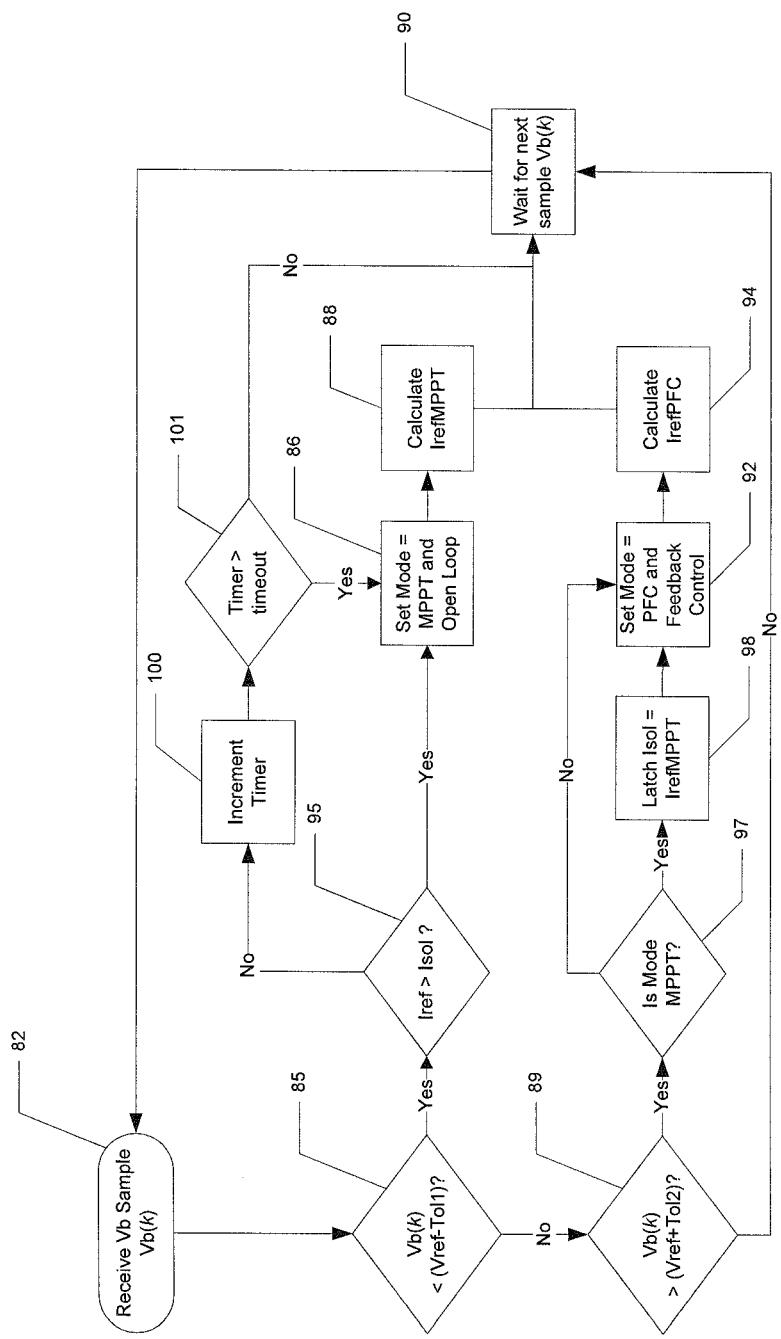

According to this embodiment, however, upon sampled voltage Vb(k) reaching a level below that of threshold Vref−Tol1 (decision 85 is "yes"), decision 95 is next executed to determine whether the current level of control current Iref applied to pulse width modulator 18 exceeds the previously stored MPPT control current level Isol. That level of control current Iref may be either control current $Iref_{MPPT}$ when power converter 5' may be under feedback control mode at this point. Decision 95 thus determines whether the current level of control current Iref, from feedback control source, is above the level of control current $Iref_{MPPT}$. In other words, decision 95 is determining whether the control current Iref is currently calling for operation of pulse width modulator 18 at a higher duty cycle than at the onset of the low load condition (i.e., indicated by the stored current level Isol). If not (decision 95 is "no"), then the currently selected control mode (e.g., PFC compensation and feedback loop control in this example) are maintained for this sample period (process 90). On the other hand, if control current Iref is now calling for operation of pulse-width modulator 18 at a higher duty cycle than at the onset of the low load condition, control mode select circuit 80 selects MPPT controller 24 as the source of control current to pulse width modulator 18, and forwards the appropriate signals ctrl_mode to converter controller 26 so that DC-DC converter stage 16 operates in an open loop manner, in process 86. And in process 88, MPPT controller 24 determines its control current $Iref_{MPPT}$ for forwarding to pulse width modulator 18. This approach to the control decision process serves to smooth the response of power converter 5' to changes at the load, preventing rapid and perhaps oscillating change of control modes in response to transient events at load LD (i.e., "transition hunting".). This feature is optional, however, and as such decision 95 and latching process 98 may be omitted from the control decision process if desired. FIG. 10c illustrates the operation of power converter 5' according to a variation on the decision process described above relative to FIG. 10b. Decisions 85, 87 are performed following receipt of a sample voltage Vb(k) in similar manner as described above relative to FIG. 10b. Decision 97 and processes 98, 92, 94 are performed in response to a low load condition reflected by sample voltage Vb(k) exceeding the threshold of reference voltage Vref plus tolerance Tol2; these processes will, as before, place power converter 5' into the control mode of PFC compensation of boost stage 14 and feedback control of DC-DC converter stage 16.

In response to the increased load condition reflected by sample voltage Vb(k) falling below the threshold of reference voltage Vref minus tolerance Tol1, optional decision 95 is carried out to determine whether the current level of control current Iref applied to pulse width modulator 18 is greater than the current level Isol stored in process 98, at the onset of a previous low load condition. If so (decision 95 is "yes"), processes 86, 88 are carried out as described above. According to this embodiment, a timer is implemented within the control circuitry (e.g., DSP 10') of power converter 5' to further smooth changes in the operating mode of power converter 5'. If the current level of control current Iref does not exceed stored current level Isol (decision 95 is "no"), that timer is advanced in process 100. Decision 101 then determines whether the timer has reached a preselected "time out" threshold. If not, the current control mode (e.g., PFC compensation and feedback control) is maintained for this sample period (process 90). If this condition of Vb(k) below Vref−Tol1 (decision 85 is "yes") and control current Iref not exceeding stored current level Isol (decision 95 is "no") persists, the timer is again advanced in process 100 and decision 101 evaluated. If the sufficient number of samples are processed with this same result to reach the time out threshold of this timer (decision 101 is "yes"), processes 86 and 88 are then executed to place power converter 5' under MPPT control of boost stage 14 and open loop operation of DC-DC converter stage 16 for this sample period (process 90).

According to this embodiment, therefore, the power converter is enabled to maximize power harvesting from the renewable input power source upon the restoration of load demand for a preselected time, even if the control current Iref called for by boost stage 14 does not exceed the level under maximum power point tracking at the onset of a previous low load condition.

Figure 10D:
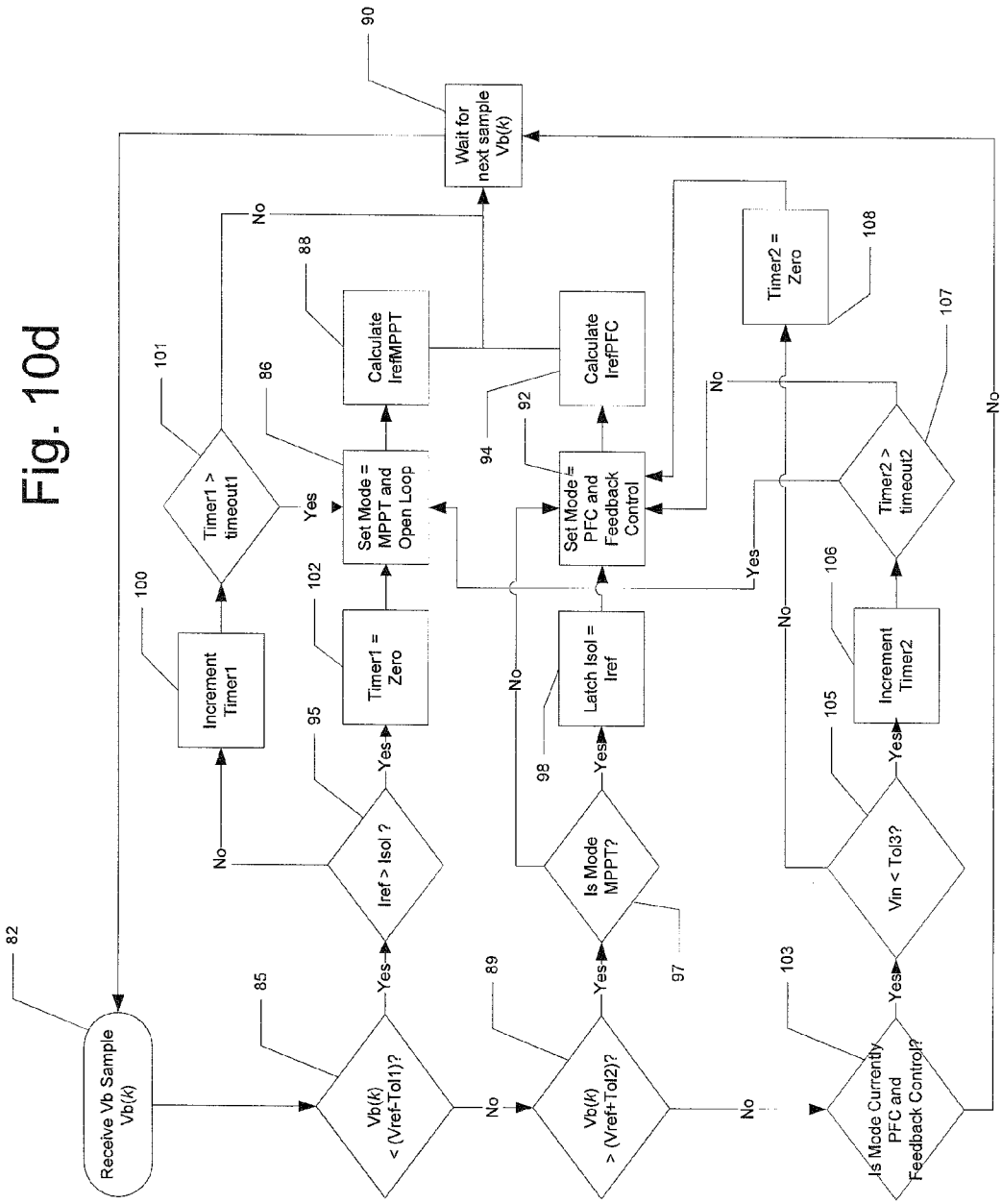

FIG. 10d illustrates the operation of power converter 5' according to a variation of the decision process described above relative to FIG. 10c. According to this embodiment, the decision process operates according to that shown in FIG. 10c for those events in which the sampled voltage Vb(k) is either above or below the threshold of reference voltage Vref minus tolerance Tol1 (i.e., either result of decision 85), and for those events in which the sampled voltage Vb(k) exceeds the threshold of reference voltage Vref plus tolerance Tol2 (decision 89 is "yes"). But this approach of FIG. 10d involves two timers, with a first timer Timer1 corresponding to the timer operated upon by process 100 and decision 101; in this variation, this timer Timer1 is set to zero in response to decision 95 determining that the current level of control current Iref exceeds stored current level Isol, as shown in FIG. 10d.

According to this embodiment, however, if sampled voltage Vb(k) is both above the threshold Vref−Tol1 (decision 85 is "no") and below the threshold Vref+Tol2 (decision 89 is "no"), decision 103 is then executed to determine whether the current control mode of power converter 5' is PFC compensation of boost stage 14 and feedback control of DC-DC converter stage 16. If not (decision 103 is "no"), the current mode of MPPT control of boost stage 14 and open loop operation of DC-DC converter stage 16 is maintained for the current sample period (process 90).

If the current control mode is PFC compensation and feedback control (decision 103 is "yes"), decision 105 is executed to determine whether the voltage Vin received at the input of power converter 5', or alternatively voltage Vin2 following input conditioning circuit 12, is below a threshold Tol3, which corresponds to a preselected minimum input voltage level. If not (decision 105 is "no"), a second timer Timer2 is set to zero in process 108, and the PFC compensation and feedback control remains enabled for this sample period (process 90). If, on the other hand, the input voltage is below threshold Tol3 (decision 105 is "yes"), second timer Timer2 is incremented in process 106, and its value is compared with a second "time out" limit in decision 107. If so (decision 107 is "yes"), then processes 86, 88 are then carried out to change the control mode of power converter 5' to MPPT control of boost stage 14 and open loop operation of DC-DC converter stage 16. If this timer Timer2 has not yet reached its time out limit (decision 107 is "no"), power converter 5' remains in PFC and feedback control mode for this sample period (process 90).

This variation on the decision process shown in FIG. 10d provides the additional functionality of placing power converter 5' into a mode that maximizes harvested power from the renewable input power source after having recovered from a loss of load event, to such an extent that sampled voltage Vb(k) is within the voltage range Vref−Tol1<Vb(k) <Vref+Tol2 and has been for a duration of time defined by the time out period of Timer2. In that event, power converter 5' is placed back into MPPT control of boost stage 14 and open loop operation of DC-DC converter stage 16.

As mentioned above, power type detection circuit 20 of power converter 5, 5' may be able to distinguish a soft DC input power source from a stiff DC input power source. A soft DC input power source is a source with low sourcing capability, in that a large enough load at the output of power converter 5 can draw down the input voltage, because the source output current is limited; solar cell array 2 is an example of a typical soft DC input power source. A stiff DC input power source, on the other hand, is capable of sourcing sufficient current at a relatively constant voltage, regardless of the load; a large load at the output of power converter 5 would not significantly draw down the input voltage as driven by a stiff DC input power source. Examples of stiff DC input power sources are battery systems, fuel cells, and over-provisioned AC to DC converters fed from the AC grid.

In the case of a stiff DC input power source, an increase in the load may not decrease the input voltage enough for power converter 5 to be placed into MPPT control of boost stage 14 and open loop operation of DC-DC converter stage 16. This situation is desirable so long as the stiff DC input power source provides sufficient power to deliver the rated power to the load, as is typically the case; power converter 5 will remain in PFC compensation of boost stage 14 and feedback control of DC-DC converter stage 16. However, a sudden or step increase in the load may, in some situations (e.g., with a discharged battery), rapidly and momentarily discharge bulk capacitor 32 in boost stage 14, causing the control mode to change to MPPT control of boost stage 14 and open loop operation of DC-DC converter stage 16. Because the boost voltage Vb is near or below the input voltage Vin in this condition (the input power source being a stiff DC source), the MPPT algorithm may converge to a non-optimal operating point. At that operating point, power converter 5 may not be able to return to PFC compensation and feedback control, except perhaps if another load or source transient occurs. Another variation in the control decision processes of FIGS. 10a through 10d can be implemented to accommodate this stiff DC input source situation, for example by comparing the boost voltage Vb with the input voltage Vin and, in response to boost voltage Vb being less than a selected tolerance above input voltage Vin, locking the control mode as PFC compensation of boost stage 14 and feedback control of DC-DC converter stage 16. This comparison thus prevents a transient discharge of capacitor 32 from falsely placing power converter 5 into MPPT control at a non-optimal operating condition.

According to these disclosed embodiments, therefore, a power converter and method of operating the same is provided that is capable of responding to low load conditions by changing the manner in which its operation is controlled. This capability ensures that a low load condition will not result in damage to the power converter or to the renewable power source, and enables safe and reliable operation even at those installations that do not provide power to the AC grid, or that either do not include a battery backup system or include such battery backup in which the battery becomes fully charged. Furthermore, these embodiments are contemplated to provide such a power converter that exhibits, when in feedback control mode in boost and DC-DC controllers, excellent dynamic bandwidth in responding to changes at the load, which is especially useful for powering variable demand loads, such as a WiMax base station or the like.

In addition, these embodiments can be implemented into power converters and power converter systems that are capable of selecting the appropriate control mode in response to detecting the type of input power source, such as described above relative to FIGS. 1 through 7. While the selection and control of power converters in response to the type of input power source, as described above, may be used independently from such selection and control in response to changing load conditions, and vice versa, it is further contemplated that the combination of these approaches will be especially advantageous in many installations.

Moreover, for some of the embodiments, there is a a power converter that includes a power converter circuit; and controller circuitry, capable of optionally receiving power from solar array, coupled to the power converter circuit to receive a output bus voltage corresponding to the voltage at the output of the power converter circuit, the controller circuitry configured to operate the power converter circuit at an operating point selected to maximize power converted from the power source and supplying the load with a higher priority than metered power when the output load is above a certain low threshold, and configured to control the voltage at the output of the power converter circuit according to a setpoint voltage responsive to the bus voltage below the low load threshold.

In some instances, the power converter circuit includes a boost stage configured to generate a DC boost voltage from power received at an input node of the power converter circuit; and a converter stage, having an input coupled to receive the DC boost voltage, and having an output galvanically isolated from its input, the converter stage configured to generate DC power at its output responsive to the DC boost voltage. The controller circuitry includes a pulse width modulator, having an output coupled to the boost stage; a maximum power point tracking controller, having a first input coupled to the power type detection function, having a current sense input coupled to an input to the boost stage, and having an output; a power factor compensation function, which can be a simple feedback controller with a DC input, having a first input coupled to an input to the boost stage, having a second input coupled to an output of the boost stage, and having an output; and a control mode select function, having an input coupled to the boost stage to receive the bus voltage, configured to couple the output of the maximum power point tracking controller to an input of the pulse width modulator responsive to the bus voltage above a low load threshold, and to couple the output of the power factor compensation function to the input of the pulse width modulator responsive to the bus voltage below the low load threshold.

In some instances, the converter stage further includes a DC-DC converter having a resonant inverting substage and a rectifying substage, each of the inverting and rectifying substage comprising a plurality of switching transistors; wherein the control function includes a converter controller, having switching control circuitry configured to control the switching transistors; an error amplifier, receiving the output of the DC-DC converter at one input and a setpoint voltage at another input, and having an output coupled to the switching control circuitry; wherein, responsive to the bus voltage above a low load threshold, the converter controller controls the switching transistors to operate the DC-DC converter at resonance of the inverting substage; and wherein, responsive to the bus voltage above a low load threshold, the converter controller controls the switching transistors responsive to the output of the error amplifier.

In some instances, the power converter further includes a power type detection circuitry operable to detect a type of power received at the input of the power converter circuit; and wherein the controller circuitry is coupled to the power type detection circuitry, and is configured to operate the power converter circuit at an operating point selected to maximize power converted from the power source responsive to the power type detection circuit detecting that the power at the input is of a first type in combination with the bus voltage above a low load threshold and, and to apply power factor compensation in the power converter circuit responsive either to the power type detection circuit detecting that the power at the input is of a second type or to the power type detection circuit detecting that the power at the input is of a first type in combination with the bus voltage below the low load threshold.

In some instances, in the power converter, the first type of power may include power generated from a source selected from the group consisting of solar cell arrays, wind-powered generators, geothermal-powered generators, and water-powered generators; and wherein power of the second type comprises power generated from a source selected from the group consisting of the AC electrical grid and fossil-fueled generators. In a situation responsive to the power type detection function detecting that the power at the input is of the first type in combination with the bus voltage above a low load threshold, the converter controller controls the switching transistors to operate the DC-DC converter at resonance of the inverting substage; and wherein, responsive either to the power type detection function detecting that the power at the input is of the second type or to the power type detection circuit detecting that the power at the input is of a first type in combination with the bus voltage below the low load threshold, the converter controller controls the switching transistors responsive to the output of the error amplifier. In some situations, the setpoint voltage is a first setpoint voltage responsive to the power at the input being of the first type, and is a second setpoint voltage, lower than the first setpoint voltage, responsive to the power at the input being of the second type.

In some embodiments, there is a method of operating a power converter to convert received from a power source to DC power, operating a boost stage in the power converter to generate a DC boost voltage from the received power; operating a resonant DC-DC converter in the power converter to produce DC power at an output from the DC boost voltage; comparing a monitored voltage corresponding to the DC boost voltage with a low load threshold; responsive to the monitored voltage being below the low load threshold, controlling the power converter according to a first control mode, including controlling the boost stage to operate at an operating point selected to maximize power converted from the power source; and responsive to the monitored voltage being above the low load threshold, controlling the power converter according to a second control mode, including applying power factor compensation or feedback control at the boost stage; and controlling the DC-DC converter to produce DC power at the output according to a setpoint voltage.

Sometimes, the method includes where the DC-DC converter can be of a resonant type; and wherein the controlling the power converter according to the first control mode further includes controlling the DC-DC converter to operate at resonance. The comparing process includes sampling the voltage corresponding to the DC boost voltage; and wherein the controlling steps comprise executing program instructions at programmable logic on a sequence of the sampled voltages. The method further including after the process of controlling the power converter according to the second control mode, and responsive to the monitored voltage being below a second threshold, then controlling the power converter according to the first control mode. The controlling the boost stage to operate at the operating point is selected to maximize power converted from the power source includes: measuring power at an input to the boost stage; generating an MPPT control current responsive to the measured power; operating a pulse width modulator responsive to the control current to produce one or more switching signals controlling the boost stage; wherein the step of applying optional power factor compensation at the boost stage includes: generating an error signal corresponding to a difference between a voltage at the output of the DC-DC converter and a voltage setpoint; and generating a PFC control current corresponding to the error signal. The method further including responsive to detecting the monitored voltage being above the low load threshold, and before the process of controlling the power converter according to the second control mode, storing an amplitude of the MPPT control current; and during the process of controlling the power converter according to the second control mode, and responsive to the monitored voltage being below a second threshold, comparing an amplitude of the PFC control current to the stored amplitude of the MPPT control current; wherein the controlling the power converter according to the first control mode after the step of controlling the power converter according to the second control mode is performed responsive to the PFC control current having an amplitude greater than the stored amplitude of the MPPT control current.

Sometimes, the method further optionally includes analyzing attributes of the received power to determine a type of power corresponding to the received power. The method further includes, after the comparing process, and responsive to the PFC control current not having an amplitude greater than the stored amplitude of the MPPT control current, evaluating a first timer relative to a first time out period; responsive to the expiration of the first time out period, controlling the power converter according to the first control mode. The method further includes: during the controlling of the power converter according to the second control mode and responsive to the monitored voltage not being above the low load threshold, comparing an input voltage to the power converter with a third threshold; responsive to the input voltage being above the third threshold, evaluating a second timer relative to a second time out period; and responsive to the expiration of second time out period, controlling the power converter according to the first control mode. When the power is identified as being a first type comprising power generated from a source selected from the group consisting of solar cell arrays, wind-powered generators, geothermal-powered generators, and water-powered generators, or a second type comprising power generated from a source selected from the group consisting of the AC electrical grid and fossil-fueled generators; and responsive to the received power being of the second type, operating the power converter according to the first control mode. The method further includes performing the comparing step responsive to the received power being of the first type.

In some embodiments, there is a power converter system for producing a DC output voltage from one or more of a plurality of power sources, including a plurality of isolating power converters, each having a power converter circuit having an input and an output, and configured to receive input power from a power source and to present DC power at its output; and controller circuitry, coupled to the power converter circuit to receive a bus voltage corresponding to the voltage at the output of the power converter circuit, the controller circuitry configured to operate the power converter circuit at an operating point selected to maximize power converted from the power source responsive to the bus voltage above a low load threshold, and configured to control the voltage at the output of the power converter circuit according to a setpoint voltage responsive to the bus voltage below the low load threshold; wherein the outputs of the isolating power converters are connected together at for coupling to a load.

In some embodiments, such power converter system further includes a battery backup subsystem coupled to the outputs of the isolating power converters. The power converter system is such that each of the isolating power converters includes a boost stage configured to generate a DC boost voltage from power received at the input of the power converter circuit; and a converter stage, having an input coupled to receive the DC boost voltage, and having an output galvanically isolated from its input, the converter stage configured to generate DC power at its output responsive to the DC boost voltage; and wherein the controller circuitry includes a pulse width modulator, having an output coupled to the boost stage; a maximum power point tracking controller, having a first input coupled to the power type detection function, having a current sense input coupled to an input to the boost stage, and having an output; a power factor compensation function or a feedback control function, having a first input coupled to an input to the boost stage, having a second input coupled to an output of the boost stage, and having an output; and a control mode select function, having an input coupled to the boost stage to receive the bus voltage, configured to couple the output of the maximum power point tracking controller to an input of the pulse width modulator responsive to the bus voltage above a low load threshold, and to couple the output of the power factor compensation function to the input of the pulse width modulator responsive to the bus voltage below the low load threshold.

In some embodiments, the power converter is such that the converter stage comprises: a DC-DC converter comprising a resonant inverting substage and a rectifying substage, each of the inverting and rectifying substage comprising a plurality of switching transistors; wherein the control function includes a converter controller, having switching control circuitry configured to control the switching transistors; an error amplifier, receiving the output of the DC-DC converter at one input and a setpoint voltage at another input, and having an output coupled to the switching control circuitry; wherein, responsive to the bus voltage above a low load threshold, the converter controller controls the switching transistors to operate the DC-DC converter at resonance of the inverting substage; and wherein, responsive to the bus voltage above a low load threshold, the converter controller controls the switching transistors responsive to the output of the error amplifier. The optional power converter system, further includes: power type detection circuitry operable to detect a type of power received at the input of the power converter circuit; and wherein the controller circuitry is coupled to the power type detection circuitry, and is configured to operate the power converter circuit at an operating point selected to maximize power converted from the power source responsive to the power type detection circuit detecting that the power at the input is of a first type in combination with the bus voltage above a low load threshold and, and to apply power factor compensation in the power converter circuit responsive either to the power type detection circuit detecting that the power at the input is of a second type or to the power type detection circuit detecting that the power at the input is of a first type in combination with the bus voltage below the low load threshold; wherein power of the first type comprises power generated from a source selected from the group consisting of solar cell arrays, wind-powered generators, geothermal-powered generators, and water-powered generators; and wherein power of the second type comprises power generated from a source selected from the group consisting of the AC electrical grid and fossil-fueled generators.

In some instances, the power converter system further includes a system controller, coupled to each of the isolating power converters, configured to set the setpoint voltage of the controller circuitry of each of the isolating power converters.

It is of course contemplated that modifications of, and alternatives to, these embodiments, will be apparent to those of ordinary skill in the art having reference to this specification and its drawings. It is contemplated that such modifications and alternatives are within the scope of the claims.

What is claimed is:

1. A power converter system for producing a direct current (DC) output voltage from one or more of a plurality of power sources, comprising:
   a plurality of isolating power converters, each power converter of the plurality of isolating power converters comprising:
      a power converter circuit having an input and an output, the power converter circuit configured to receive input power from a power source at the input and to provide DC power at the output;
      a boost stage configured to generate a bus voltage from the input power received at the input of the power converter circuit;
      a converter stage having an input configured to receive the bus voltage from the boost stage and an output galvanically isolated from the converter stage input, wherein the converter stage is configured to generate DC power at the converter stage output from the bus voltage; and
      controller circuitry coupled to the power converter circuit and configured to receive the bus voltage, the controller circuitry configured to operate the power converter circuit at an operating point selected to facilitate maximizing power converted from the power source when the bus voltage is above a predetermined threshold, the controller circuitry further configured to control the voltage at the output of the power converter circuit according to a setpoint voltage when the bus voltage is below the predetermined threshold, wherein the controller circuitry comprises:
         a pulse width modulator having an output coupled to the boost stage;
         a maximum power point tracking controller having: i) a first input coupled to power type detection circuitry, ii) a current sense input coupled to an input of the boost stage, and iii) an output;
         one of power factor compensation circuitry and feedback control circuitry, the one of power factor compensation circuitry and feedback control circuitry having: i) a first input coupled to the input of the boost stage, ii) a second input coupled to an output of the boost stage, and iii) an output; and
         control mode select circuitry having an input coupled to the boost stage to receive the bus voltage, the control mode select circuitry configured to couple the output of the maximum power point tracking controller to an input of the pulse width modulator when the bus voltage is above the predetermined threshold, and configured to couple the output of the one of power factor compensation circuitry and feedback control circuitry to the input of the pulse width modulator when the bus voltage is below the predetermined threshold; and wherein the outputs of the plurality of isolating power converters are connected together for coupling to a load.

2. The power converter system of claim 1 further comprising:
a battery backup subsystem coupled to the output of each power converter of the plurality of isolating power converters.

3. The power converter system of claim 1 further comprising:
a system controller coupled to each power converter of the plurality of isolating power converters, the system controller configured to set the setpoint voltage of the controller circuitry of each power converter of the plurality of isolating power converters.

4. A power converter system for producing a DC output voltage from one or more of a plurality of power sources, comprising:
a plurality of isolating power converters, each power converter of the plurality of isolating power converters comprising:
a power converter circuit having an input and an output, the power converter circuit configured to receive input power from a power source at the input and provide DC power at the output;
controller circuitry coupled to the power converter circuit and configured to receive a bus voltage corresponding to the voltage at the output of the power converter circuit, the controller circuitry configured to operate the power converter circuit at an operating point selected to facilitate maximizing power converted from the power source when the bus voltage is above a predetermined threshold, the controller circuitry further configured to control the voltage at the output of the power converter circuit according to a setpoint voltage when the bus voltage is below the predetermined threshold; and power type detection circuitry configured to detect a type of power received at the input of the power converter circuit, wherein the controller circuitry is coupled to the power type detection circuitry, and wherein the controller circuitry is further configured to:
operate the power converter circuit at the operating point selected to facilitate maximizing power converted from the power source when the power type detection circuitry detects that i) the power received at the input of the power converter circuit is a first type of power, and ii) the bus voltage is above the predetermined threshold; and
apply a power factor compensation in the power converter circuit when the power type detection circuitry detects one of i) the power received at the input of the power converter circuit is a second type of power, and ii) the power received at the input of the power converter is the first type of power and the bus voltage is below the predetermined threshold;
wherein power of the first type includes power generated from at least one of solar cell arrays, wind-powered generators, geothermal-powered generators, and water-powered generators, and wherein power of the second type includes power generated from at least one of an alternating current (AC) electrical grid and fossil-fueled generators.

5. The power converter system of claim 4 further comprising:
a battery backup subsystem coupled to the output of each power converter of the plurality of isolating power converters.

6. The power converter system of claim 4 further comprising:
a system controller coupled to each power converter of the plurality of isolating power converters, the system controller configured to set the setpoint voltage of the controller circuitry of each power converter of the plurality of isolating power converters.

* * * * *